(12) United States Patent
Kanagarathinam et al.

(10) Patent No.: US 11,153,779 B2
(45) Date of Patent: Oct. 19, 2021

(54) APPARATUS AND METHOD FOR TRANSMITTING AND RECEIVING DATA BASED ON AN IDENTIFIED EVENT IN WIRELESS COMMUNICATION SYSTEM

(71) Applicant: SAMSUNG ELECTRONICS CO., LTD., Suwon-si (KR)

(72) Inventors: Madhan Raj Kanagarathinam, Bangalore (IN); Karthikeyan Arunachalam, Bangalore (IN); Venkata Sunil Kumar B, Bangalore (IN); Ranjith Kumar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/718,323

(22) Filed: Dec. 18, 2019

(65) Prior Publication Data
US 2020/0288346 A1    Sep. 10, 2020

(30) Foreign Application Priority Data

Mar. 7, 2019 (IN) .............................. 201941008914
Jun. 14, 2019 (KR) ........................ 10-2019-0071064

(51) Int. Cl.
*H04W 28/04* (2009.01)
*H04L 1/18* (2006.01)
(Continued)

(52) U.S. Cl.
CPC ........... *H04W 28/04* (2013.01); *H04L 1/1825* (2013.01); *H04L 1/1848* (2013.01); *H04W 28/06* (2013.01); *H04W 80/06* (2013.01)

(58) Field of Classification Search
CPC ..... H04W 28/04; H04W 80/06; H04W 28/06; H04L 1/1848; H04L 1/1825; H04L 1/1858
See application file for complete search history.

(56) References Cited

U.S. PATENT DOCUMENTS

| | | |
|---|---|---|
| 7,502,818 B2 | 3/2009 | Kohno et al. |
| 10,601,554 B2 | 3/2020 | Zhang et al. |

(Continued)

FOREIGN PATENT DOCUMENTS

| | | |
|---|---|---|
| EP | 1841118 B1 | 10/2007 |
| EP | 2979487 B1 | 2/2016 |

(Continued)

OTHER PUBLICATIONS

International Search Report (PCT/ISA/210) dated Mar. 18, 2020 from the International Searching Authority in application No. PCT/KR2019/017731.

(Continued)

*Primary Examiner* — Kiet Tang
(74) *Attorney, Agent, or Firm* — Sughrue Mion, PLLC

(57) ABSTRACT

A method and apparatus for transmitting and receiving data in a wireless communication system are provided, and an operation method of a terminal for transmitting and receiving data in a wireless communication system includes: identifying at least one missing data packet from among a plurality of data packets transmitted from an external device; identifying an event corresponding to the at least one missing data packet; and setting a time period for receiving the at least one missing data packet, based on a network metric data corresponding to the identified event.

15 Claims, 13 Drawing Sheets

(51) Int. Cl.
*H04W 80/06* (2009.01)
*H04W 28/06* (2009.01)

(56) References Cited

U.S. PATENT DOCUMENTS

| | | | | |
|---|---|---|---|---|
| 2009/0201818 | A1* | 8/2009 | Patwardhan | H04L 1/1848 |
| | | | | 370/241 |
| 2011/0110230 | A1* | 5/2011 | Zhuang | H04L 43/16 |
| | | | | 370/230 |
| 2013/0028088 | A1* | 1/2013 | Do | H04L 1/0034 |
| | | | | 370/235 |
| 2018/0191479 | A1 | 7/2018 | Baek et al. | |

FOREIGN PATENT DOCUMENTS

| | | |
|---|---|---|
| KR | 10-0879149 B1 | 1/2009 |
| KR | 10-2012-0068590 A | 6/2012 |
| KR | 1020180048760 A | 5/2018 |

OTHER PUBLICATIONS

Davis, E., et al., "Improving Packet Delivery Performance of Publish/Subscribe Protocols in Wireless Sensor Networks", Sensors, Jan. 4, 2013, vol. 13, pp. 648-680 (33 pages).

"HARQ Entity/Process", Aug. 2018, LTE Basic Procedure, retrieved from www.sharetechnote.com/html/BasicProcedure_LTE_HARQ.html, 5 pages total.

"Calculating TCP RTO", Feb. 5, 2012, Everything about nothing, retrieved from sgros.blogspot.com/2012/02/calculating-tcp-rto.html, 5 pages total.

* cited by examiner

APPARATUS AND METHOD FOR TRANSMITTING AND RECEIVING DATA BASED ON AN IDENTIFIED EVENT IN WIRELESS COMMUNICATION SYSTEM

CROSS-REFERENCE TO RELATED APPLICATION

This application is based on and claims priority under 35 U.S.C. § 119 to Indian Patent Application No. 201941008914, filed on Mar. 7, 2019, in the Indian Patent Office, and claims priority under 35 U.S.C. § 119 to Korean Patent Application No. 10-2019-0071064, filed on Jun. 14, 2019, in the Korean Intellectual Property Office, the disclosures of which are incorporated herein by reference in their entirety.

BACKGROUND

1. Field

The disclosure relates to transmission and reception of data in a wireless communication system, and more particularly, to an apparatus and method for optimizing transmission of data packets in a wireless transmission control protocol (TCP) communication system.

2. Description of Related Art

Recently, with the rapid development of computer technology and computer networks, wireless communication has become very important. In general, the transmission control protocol/Internet protocol (TCP/IP) is recognized as one of the most reliable protocol in computer networks. However, the TCP/IP is a protocol that operates well in a wired network in which a network node is fixed. Accordingly, with the introduction of a $5^{th}$ generation (5G) network, there is a demand for smoothly operating wireless TCP in terms of various network metrics such as throughput, reliability, and latency.

SUMMARY

Provided are apparatuses and methods for transmitting and receiving data in a wireless communication system.

According to an aspect of the disclosure, there is provided an operation method of a terminal for transmitting and receiving data in a wireless communication system, the operation method comprising: identifying at least one missing data packet from among a plurality of data packets transmitted from an external device; identify an event corresponding to the at least one missing data packet; and setting a time period for receiving the at least one missing data packet based on a network metric data corresponding to the identified event.

The event may comprise at least one of spurious loss (SL), burst loss (BL), or consecutive packet loss (CPL).

The setting the time period may comprise, when the event is identified to be the SL, setting a length of the time period based on the network metric data corresponding to the SL, and wherein the network metric data corresponding to the SL may comprise at least one of an estimated smooth round trip time (SRTT) or a round trip time variance (RTTVAR).

The setting the time period may further comprise: when the event is identified to be the BL, identifying a state of an edge node corresponding to a network state of the terminal; and setting a length of the time period based on at least one of the identified state of the edge node or a mobility parameter.

The operation method may further comprise receiving the at least one missing data packet during the set the time period, based on a coordinated Snoop and automatic repeat request (ARQ) retransmission.

The operation method may further comprise when the event is identified to be the CPL, controlling a transmission rate of a duplicate acknowledgement (Dup ACK) transmitted from the terminal to the external device.

The controlling of the transmission rate of the Dup ACK may comprise: identifying occurrence of handover of the terminal; calculating a time required for performing the handover; and adjusting a number of triple Dup ACKs (TDAs) based on the calculated time.

The operation method may further comprise receiving the at least one missing data packet from the external device during the set time period.

The receiving of the at least one missing data packet may further comprises: when the event is identified to be the BL or the CPL, transmitting a probe packet to the external device; and receiving the at least one missing data packet retransmitted from the external device, after receiving an ACK for the transmitted probe packet.

According to an another aspect of the disclosure, there is provided a terminal for transmitting and receiving data in a wireless communication system, the terminal comprising: an input/output interface; a memory storing one or more instructions; and at least one processor configured to execute the one or more instructions stored in the memory to: identify at least one missing data packet from among a plurality of data packets transmitted from an external device, identify an event corresponding to the at least one missing data packet, and setting a time period for receiving the at least one missing data packet based on a network metric data corresponding to the identified event.

The event may comprise at least one of spurious loss (SL), burst loss (BL), or consecutive packet loss (CPL).

The at least one processor may be further configured to, when the event is identified to be the SL, set a length of the time period based on a network metric data corresponding to the SL, and wherein the network metric data corresponding to the SL comprises at least one of an estimated smooth round trip time (SRTT) or a round trip time variance (RTTVAR).

The at least one processor may further configured to, when the event is identified to be the BL, identify a state of an edge node corresponding to a network state of the terminal, and set a length of the time period based on at least one of the identified state of the edge node or a mobility parameter.

The at least one processor may be further configured to receive the at least one missing data packet during the set length of the time period, based on coordinated Snoop and automatic repeat request (ARQ) retransmission.

The terminal at least one processor may be further configured to, when the event is identified to be the CPL, control a transmission rate of a duplicate acknowledgement (Dup ACK) transmitted from the terminal to the external device.

The at least one processor may be further configured to identify occurrence of handover of the terminal, calculate a time required for performing the handover, and adjust a number of triple Dup ACKs (TDAs) based on the calculated time.

The at least one processor may be further configured to receive the at least one missing data packet from the external device, during the set length of the time period.

The at least one processor may be further configured to when the event is identified to be the BL or the CPL, transmit a probe packet to the external device, and receive at least one missing data packet retransmitted from external device, in response to a received ACK for the transmitted probe packet.

According to another aspect of the disclosure, there is provided a non-transitory computer-readable readable medium having stored thereon a program for performing a method comprising: identifying at least one missing data packet from among a plurality of data packets transmitted from an external device; identify an event corresponding to the at least one missing data packet; and setting a time period for receiving the at least one missing data packet based on a network metric data corresponding to the identified event.

According to another aspect of the disclosure, there is provided an apparatus in a communication system comprising: a memory storing one or more instructions; and a processor configured to execute the one or more instructions to: identify a missing data packet from among a plurality of data packets transmitted from an external device; identify an event corresponding to the missing data packet to be missing; obtain a network metric data corresponding to the identified event; and initiate a recovery process to recover the missing data packet based on the network metric data corresponding to the identified event.

The identified event may be an event that causes the missing data packet.

The identified event may comprise at least one of spurious loss (SL), burst loss (BL), or consecutive packet loss (CPL).

The processor is may further configured to: initiate a first process when the identified event is the SL; initiate a second process when the identified event is the BL; and initiate a third process when the identified event is the CPL, wherein the first process, the second process and the third process are different.

In initiating the recovery process to recover the missing data packet, the processor may be further configured to schedule a time period for receiving the missing data packet based on a network metric data corresponding to the identified event.

A length of the time period may be adjusted based on a type of the event, among the SL, the BL and the CPL.

According to another aspect of the disclosure, there is provided a method performed in a communication system comprising: identifying a missing data packet from among a plurality of data packets transmitted from an external device; identifying an event corresponding to the missing data packet to be missing; obtaining a network metric data corresponding to the identified event; and initiating a recovery process to recover the missing data packet based on the network metric data corresponding to the identified event.

The identified event may be an event that causes the missing data packet.

The identified event may comprise at least one of spurious loss (SL), burst loss (BL), or consecutive packet loss (CPL).

The initiating the recovery process may comprise: initiating a first process when the identified event is the SL; initiating a second process when the identified event is the BL; and initiating a third process when the identified event is the CPL, wherein the first process, the second process and the third process are different.

The initiating the recovery process may comprise scheduling a time period for receiving the missing data packet based on a network metric data corresponding to the identified event.

A length of the time period may be adjusted based on a type of the event, among the SL, the BL and the CPL.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
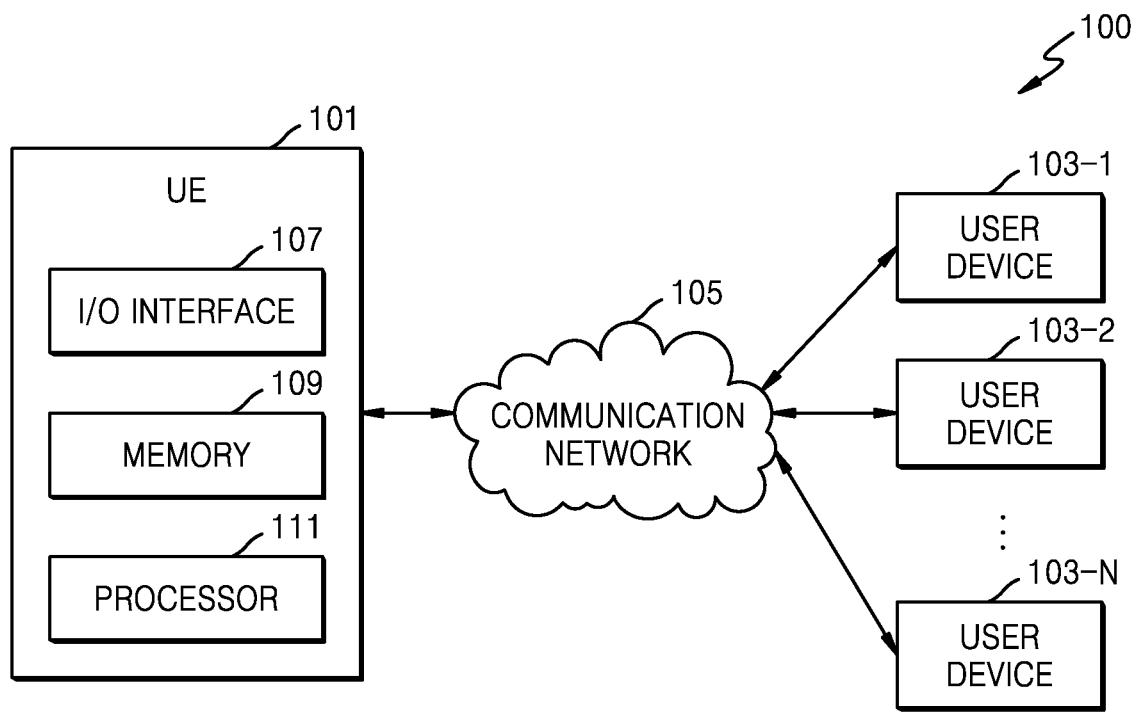
FIG. 1A is a diagram illustrating a system for optimizing transmission of data packets in a transmission control protocol (TCP) communication system according to an embodiment of the disclosure.

Hereinafter, embodiments of the disclosure will be described in detail in order to fully convey the scope of the disclosure and enable one of ordinary skill in the art to embody and practice the disclosure. The embodiments of the disclosure may be implemented in various forms and the disclosure is not limited thereto. Also, parts in the drawings unrelated to the detailed description are omitted to ensure clarity of the disclosure, and like reference numerals in the drawings denote like elements.

The terms used in the disclosure are selected from among common terms that are currently widely used in consideration of their functions in the disclosure, but the terms may be different according to the intention of one of ordinary skill in the art, a precedent, or the advent of new technology. Accordingly, the specific terms used herein should be understood based on the unique meanings thereof and the whole context of the disclosure.

It will be understood that although the terms "first", "second", etc. may be used herein to describe various elements, these elements should not be limited by these terms. These terms are only used to distinguish one element from another.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The phrases "in some embodiments of the disclosure" or "in an embodiment of the disclosure" throughout the specification do not necessarily all refer to the same embodiment of the disclosure.

The disclosure may be described in terms of functional block components and various processing steps. Such functional blocks may be realized by any number of hardware and/or software components configured to perform specific functions. For example, the functional blocks of the disclosure may be realized by one or more microprocessors or circuit components for a predetermined function. Furthermore, for example, the functional blocks of the disclosure may be implemented with various programming or scripting language. The functional blocks may be implemented in algorithms that are executed on one or more processors. Furthermore, the disclosure could employ any number of conventional techniques for electronics configuration, signal processing, and/or data processing. The terms "mechanism", "element", "means", and "configuration" may be used broadly and are not limited to mechanical or physical embodiments of the disclosure.

Furthermore, connecting lines, or connectors shown in the various figures are intended to represent exemplary functional relationships and/or physical or logical couplings between various elements. It should be noted that many alternative or additional functional relationships, physical connections, or logical connections may be present in a practical device. Also, the same reference numerals in FIGS. 1A through 14 may denote the same elements.

The disclosure will now be described in more detail with reference to the accompanying drawings, in which embodiments of the disclosure are shown.

Generally, in a wireless network, data loss may occur due to bit rates, handover, etc. Hence, wireless handover may not be efficiently managed in an existing TCP system. Also, efforts are made to improve system network performance of a current wireless communication system in terms of mobile network and coordinated multi-points (CoMP). Also, when a bandwidth error rate and a bandwidth-delay product (BDP) increase, a utilization rate in an existing system may decrease. Also, an existing TCP system mainly uses Karn and Jacobson's algorithm, which does not provide accurate results in a wireless network.

Embodiments of the disclosure relate to a method and user equipment (UE) for optimizing transmission of data packets in a wireless TCP (WTCP) communication system. In an embodiment of the disclosure, WTCP may be a proxy-based modification of TCP that preserves the end-to-end semantics of the TCP. Although TCP is one of the most important protocols and vital elements of the Internet protocol suite, there are various problems in data retransmission and retransmission ambiguity.

In general, one or more algorithms for avoiding such retransmission ambiguity may be used in TCP. In an embodiment of the disclosure, the one or more algorithms may include Karn and Jacobson's algorithm. However, the algorithms are not reliable for TCP, and may not accurately operate for TCP. In these conditions, the disclosure may identify one or more data packets that are missing from received data packets. According to an embodiment, the one or more data packets may be identified as missing from received data packets based on the occurrence of one or more events.

In an embodiment of the disclosure, the one or more events may include triggering of at least one of spurious loss (SL) or consecutive packet loss (CPL). According to an embodiment, a retransmission timeout (RTO) timer may start during a time interval for receiving the missing one or more data packets. The term "RTO" may refer to a time for which a transmitting end has to wait for an acknowledgement response to a transmitted segment.

A network metric may be calculated based on a current network state in which data packets are transmitted. Next, the RTO timer for receiving the missing one or more data packets may be modified based on the network metric. A method according to the disclosure may optimize transmission of data packets in a wireless TCP communication system by controlling unnecessary retransmission of missing data packets by using a modified RTO timer. Embodiments of the disclosure may provide a method for optimizing data transmission at a UE level, and in this case, the need for any modification in a base station (BS) or other network entities may be eliminated.

FIG. 1A is a diagram illustrating a system for optimizing transmission of data packets in a wireless TCP communication system according to an embodiment of the disclosure.

Referring to FIG. 1A, a system 100 may include a UE 101, user devices 103-1, 103-2, . . . 103-N, and a communication network 105. The system 100 may include the UE 101 connected to a user device (e.g., 103-1) through the communication network 105. The user device 103-1 may provide data packets to the UE 101.

In an embodiment of the disclosure, the UE 101 may be a terminal. According to another embodiment, the terminal may include a mobile station (MS), a cellular phone, a smartphone, a computer, or a multimedia system for performing a communication function. In an embodiment of the disclosure, the terminal may function as a transmitting or receiving end. Also, another terminal may function as a transmitting or receiving end.

In an embodiment of the disclosure, the UE 101 may include an input/output (I/O) interface 107, a memory 109, and a processor 111. However, all elements illustrated in FIG. 1A may not be essential elements of the UE 101. The UE 101 may include elements more or fewer than those illustrated in FIG. 1A.

In an embodiment of the disclosure, the I/O interface 107 may communicate with the user device 103-1 or another electronic device connected by wire or wirelessly. For example, the I/O interface 107 may receive a plurality of data packets from the user device 103-1.

Various kinds of data such as files and various kinds of programs such as applications may be installed and stored in the memory 109. The processor 111 may access and use data stored in the memory 109 or may store new data in the memory 109. For example, a plurality of data packets received from the I/O interface 107 may be stored in the memory 109. The memory 109 may be connected to the processor 111 of the UE 101 to communicate with the processor 111. Also, the memory 109 may store processor instructions for instructing the processor 111 to execute instructions for optimizing transmission of data packets in a wireless TCP communication system.

The processor 111 may control an overall operation of the UE 101 and may include at least one processor such as a central processing unit (CPU) or a graphics processing unit (GPU). The processor 111 may control other elements included in the UE 101 to perform an operation for operating the UE 101. For example, the processor 111 may execute a program stored in the memory 109, may read a stored file, or may store a new file. In an embodiment of the disclosure, the processor 111 may perform an operation for operating the UE 101 by executing a program stored in the memory 109.

According to an embodiment of the disclosure, in a wireless TCP communication network, an entity that transmits a data packet may be defined as a transmitting end (e.g., a transmitting node) or a transmitter, and an entity that receives a data packet transmitted from a transmitting end and transmits an acknowledgement (ACK) may be defined as a receiving end (e.g., a receiving node) or a receiver. In FIG. 1A, the UE 101 may function as a transmitting end or a receiving end. The user device 103-1 may also function as a transmitting end or a receiving end. For example, when the user device is a transmitting end and the UE 101 is a receiving end, the user device 103-1 may transmit a data packet to the UE 101, and the UE 101 may transmit an ACK to the user device 103-1 in response to the received data packet.

Although only elements of the UE 101 are illustrated in FIG. 1A for convenience of explanation, the user device 103-1 may include the same elements as those of the UE 101. For example, the user device may include, but is not limited to, an I/O interface, a memory, and a processor.

In an embodiment of the disclosure, during a data transmission process, the UE 101 may receive at least one data packet from among a plurality of data packets transmitted by one user device 103-1 from among user devices 103-1, 103-2 . . . 103-N through a wireless TCP communication network. The UE 101 may receive each of the plurality of data packets transmitted by the user device 103-1. However, when the UE 101 receives one or more data packets, the UE 101 may identify one or more missing data packets from among the received data packets. In this case, the data packets may be missing due to the occurrence of one or more events. The UE 101 may identify that the one or more data packets is missing due to a type of the one or more events.

In an embodiment of the disclosure, the one or more events that may cause the data packets to be missing may include triggering of at least one of spurious loss (SL), burst loss (BL), or consecutive packet loss (CPL). In an embodiment of the disclosure, SL may be caused by a sudden delay spike or reordering in a network, and may cause a TCP communication system to experience a loss event. In a TCP network, loss may be interpreted as a sign of congestion, and may reduce a transmission rate of a protocol.

In an embodiment of the disclosure, BL may refer to a condition where a first symbol and a last symbol are in an error state in a contiguous sequence of symbols received through a communication channel. Also, there may exist no contiguous subsequence of correctly received symbols within error burst.

In an embodiment of the disclosure, CPL may refer to loss of multiple consecutive packets during handover. In an embodiment of the disclosure, the term "handover" may refer to a process of transmitting an ongoing data session from one channel to another channel. Embodiments of the disclosure may also apply to ultra-low latency in a communication system.

In an embodiment of the disclosure, the user device 103-1 may be computing devices related to users. For example, the computing devices may include a laptop, a desktop computer, a personal digital assistant (PDA), a notebook, a smartphone, a tablet, and other computing devices. It will be understood by one of ordinary skill in the art that other unmentioned user devices for providing data packets may be encompassed in the disclosure.

In an embodiment of the disclosure, the communication network 105 may include, but is not limited to, a wireless network using wireless application protocol (WAP), the Internet, Wi-Fi, or the like. For example, the communication network 105 may include different generation wireless communication systems such as $2^{nd}$ generation (2G), $3^{rd}$ generation (3G), Long Term Evolution (LTE), and $5^{th}$ generation (5G) wireless communication systems. The UE 101 and the user device 103-1 may be connected to each other by using TCP. In this case, the UE 101 may optimize data transmission by controlling unnecessary retransmission and a delayed timeout. Through the optimization of the data transmission, latency of a TCP communication system may be improved. In an embodiment of the disclosure, the UE 101 may include, but is not limited to, a laptop, a computer, a PDA, a notebook, a smartphone, a tablet, and another user computing device. It will be understood by one of ordinary skill in the art that other unmentioned arbitrary devices may be used as the UE 101.

Figure 1B:
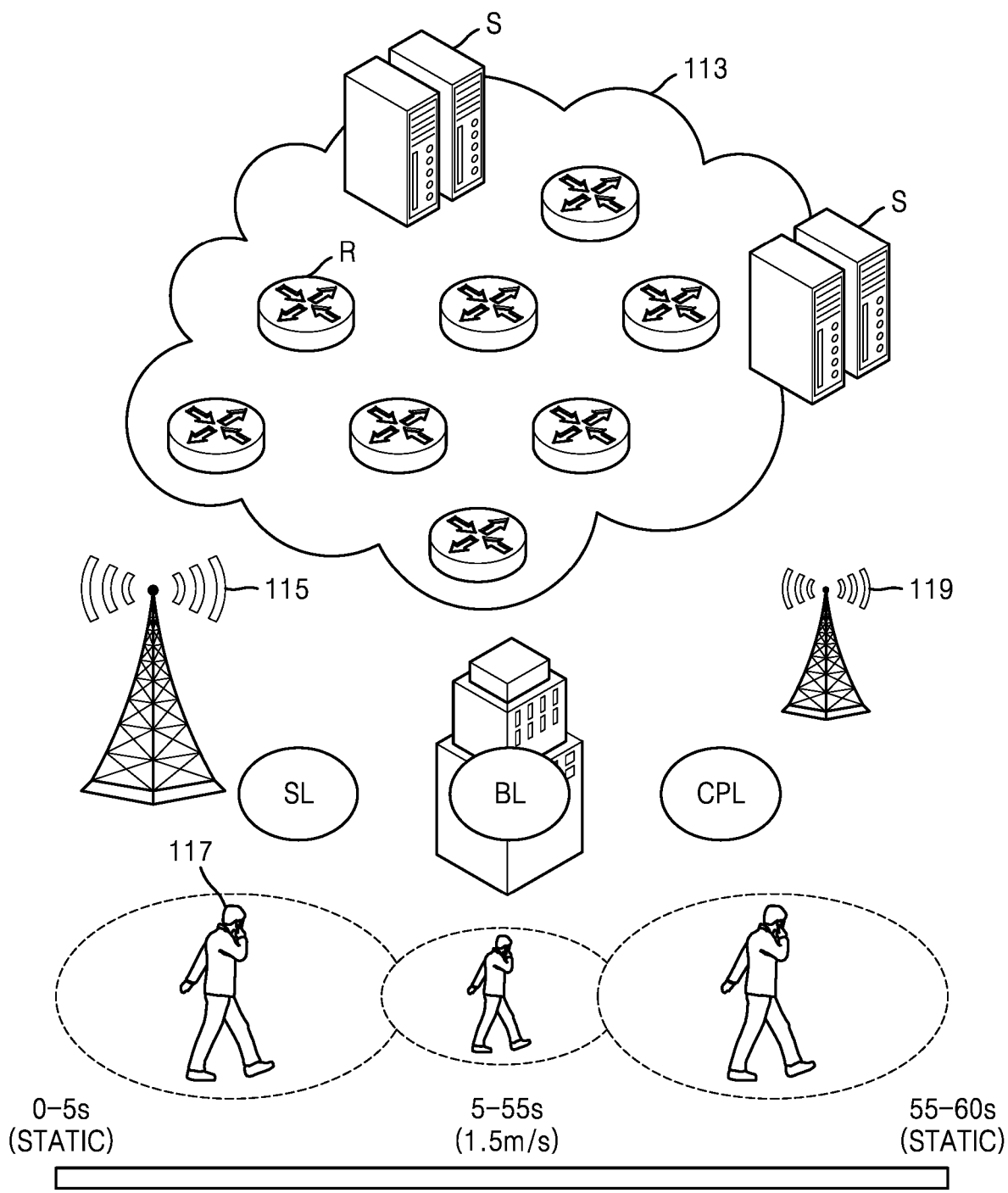
FIG. 1B is a diagram illustrating an example where a user device experiences various losses during transmission of data packets in a wireless network according to an embodiment of the disclosure.

FIG. 1B is a diagram illustrating an example where a user device experiences various losses during transmission of data packets in a wireless network according to an embodiment of the disclosure.

Referring to FIG. 1B, a TCP communication system 113 includes routers R and one or more servers S connected through a first BS 115 and a second BS 119 located in an arbitrary area. In an embodiment of the disclosure, a scenario in which a user 117 speaks over a user device in an area near the first BS 115 may be considered. In an embodiment of the disclosure, the user device may be a mobile phone. In the scenario, the mobile phone of the user 117 may receive at least one packet from a receiving end through the first BS 115.

In an embodiment of the disclosure, a scenario in which the user 117 who is in a static state begins to slowly move may be considered. In the scenario, the user 117 may experience an SL event. In this case, the SL event may be poll-based, and may start when a download operation is performed in the mobile phone. Also, the SL event may occur along with a BL event and a CPL event which are described below.

In an embodiment of the disclosure, a scenario in which the user 117 moves from a line of sight (LOS) to a non-line of sight (NLOS) or vice versa may be considered. In the scenario, the user 117 may experience a BL event. In an embodiment of the disclosure, when the user 117 moves from the first BS 115 and handover occurs with the mobile phone of the user 117 from the first BS 115 to the second BS 119, the user 117 may experience a CPL event. In this case, the first BS 115 may be a gNode B (gNB) and the second BS 119 may be an eNode B (eNB). In an embodiment of the disclosure, the CPL event may occur in an outage area during the handover. In an embodiment of the disclosure, because one or more events may be independent from one another, all events may occur in combination with one another. In an embodiment of the disclosure, each of BSs such as the first BS 115 and the second BS 119 that performs resource allocation of a terminal may be at least one of a gNode B, an eNode B, a Node B, a BS, a wireless access unit, a BS controller, or a node on a network.

In an embodiment of the disclosure, due to the occurrence of at least one event from among the above events, one or more data packets transmitted to the UE 101 may be missing. The UE 101 may identify the one or more missing data packets, and may initiate an RTO timer during a time interval allocated for receiving the missing one or more data packets. In an embodiment of the disclosure, TCP may ensure data transmission by using an RTO, even when there is no feedback from a data receiving end.

In an embodiment of the disclosure, a network metric may be calculated based on current network states in which a plurality of data packets are transmitted. Next, the UE 101 may generate a modified RTO timer based on the calculated network metric in order to receive the one or more missing data packets. The UE 101 may optimize transmission of data packets in the TCP communication system 113 by using the modified RTO timer.

In an embodiment of the disclosure, the occurrence of the at least one event may include a delayed timeout for optimizing transmission of data packets in the TCP communication system 113 and controlling unnecessary retransmission of data packets. In an embodiment of the disclosure, when the SL occurs, the one or more missing data packets may be recovered by estimating the RTO based on the network metric. For example, the UE 101 may estimate a smoothed round trip time (SRTT) and a round trip time variance (RTTVAR), and may update the RTO based on the estimated SRTT and RTTVAR.

In an embodiment of the disclosure, when the BL occurs, the one or more missing data packets may be recovered by determining a dynamic RTO based on a mobility parameter and a state of an edge node provided based on a current network state. Also, the one or more missing data packets may be recovered based on coordinated Snoop and automatic repeat request (ARQ) retransmission. In an embodiment of the disclosure, the dynamic RTO may be the modified RTO. In an embodiment of the disclosure, the UE 101 may trigger a duplicate acknowledgement (Dup ACK) to be transmitted to a server based on the RTO. When the server receives the Dup ACK, the server may reduce throughput by reducing a size of a congestion window (CWND). The UE 101 may prevent throughput from being significantly reduced due to a temporary SL condition by controlling the RTO.

In an embodiment of the disclosure, when the CPL occurs, the one or more missing data packets may be recovered by managing a transmission rate of the Dup ACK. In an embodiment of the disclosure, the managing of the Dup ACK may include determining the occurrence of a handover event and calculating a handover time when the handover event is determined. Also, the number of transmitted triple Dup ACKs (TDAs) may be determined based on the CWND learned by the server. In an embodiment of the disclosure, the calculated TDAs may be shared before the RTO expires, and the number of transmitted TDAs may be adjusted based on the handover time.

In an embodiment of the disclosure, in order to receive the one or more missing data packets, the UE 101 may wait for an additional time for receiving missing data packets by using the modified RTO, instead of triggering the Dup ACK by using a legacy operation. During the additional time, the UE 101 may receive the one or more missing data packets, and in this case, the Dup ACK may be triggered. When the one or more missing data packets are not received even during the additional time, the missing data packets may be received from the server.

In an embodiment of the disclosure, assuming that a transmitting end transmits a plurality of segments to a receiving end in TCP communication, when an order in which the receiving end receives the plurality of segments is not the same as an order in which the transmitting end transmits the plurality of segments, the Dup ACK may be an ACK generated by the receiving end. In this case, because the ACK generated by the receiving end is the same as an ACK for a segment that is most recently normally received by the receiving end, the transmitting end may recognize the generated ACK as the Dup ACK. In an embodiment of the disclosure, when three TDAs are received, the TCP transmitting end may determine that a segment is missing, and may perform segment retransmission irrespective of whether the RTO expires. In the disclosure, a data packet and a packet refer to segments transmitted from a TCP transmitting end to a receiving end may be interchangeably used.

Figure 2:
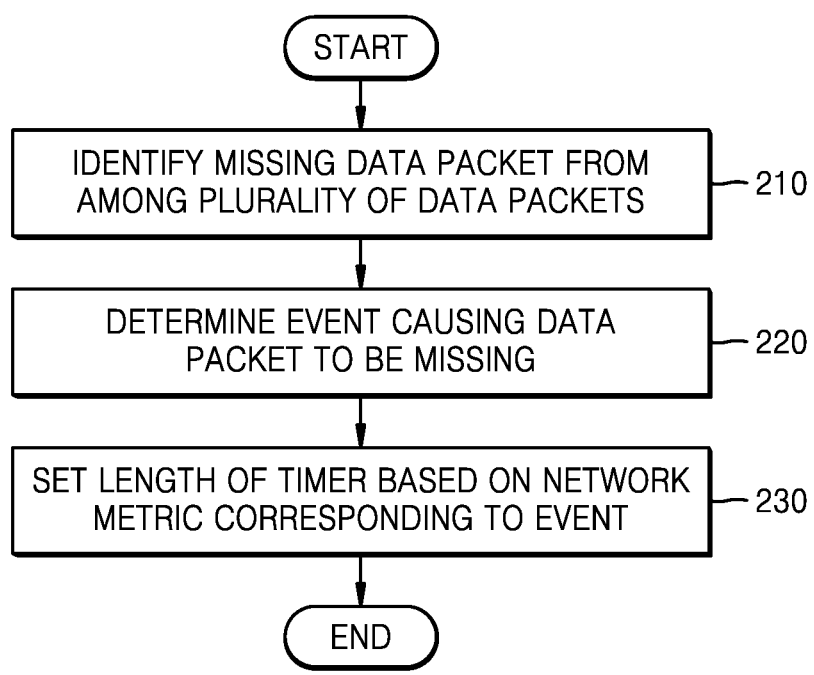
FIG. 2 is a flowchart illustrating an operation method of a user equipment (UE) according to an embodiment of the disclosure.

FIG. 2 is a flowchart illustrating an operation method of a UE according to an embodiment of the disclosure. In FIG. 2, the UE may be a receiving end that receives a data packet in a wireless TCP communication network.

Referring to FIG. 2, in operation 210, the UE 101 may identify a missing data packet from among a plurality of data packets. For example, the UE 101 may identify at least one missing data packet from among a plurality of data packets transmitted from a transmitting end, in a wireless TCP communication network. In an embodiment of the disclosure, the transmitting end may be at least one user device 103-1 of FIG. 1A that is connected by wire or wirelessly to the UE 101 and transmits a data packet to the receiving end. In another embodiment of the disclosure, the transmitting end may be a server that is connected by wire or wirelessly to the UE 101 and transmits a data packet to the receiving end. According to an embodiment, the server may be connected by wire or wirelessly to the user device 103-1, and may transmit a data packet to the receiving end through the user device 103-1.

In operation 220, the UE 101 may determine an event, which causes the data packet to be missing. For example, the event that causes the data packet to be missing may include SL, BL, or CPL. In an embodiment of the disclosure, the SL may be caused by a sudden delay spike or reordering in a network. Also, the BL may be caused by the mobility of the UE 101 even when the network is not congested. Also, the CPL may be caused by handover or the like of the UE 101. Because the events are independent from one another, one or more events may occur in combination with one another.

In operation 230, the UE 101 may set a length of a timer based on a network metric corresponding to the event. In an embodiment of the disclosure, the timer may be an RTO timer used for retransmission of a data packet in the TCP communication network. When the event is determined to be the SL, the UE 101 may set a length of the timer based on the network metric. Also, when the event is determined to be the BL, the UE 101 may set a length of the timer based on a mobility parameter and a state of an edge node. Also, when the event is determined to be the CPL, the UE 101 may receive the missing data packet by using a Dup ACK control method or a probe packet transmission method.

Figure 3:
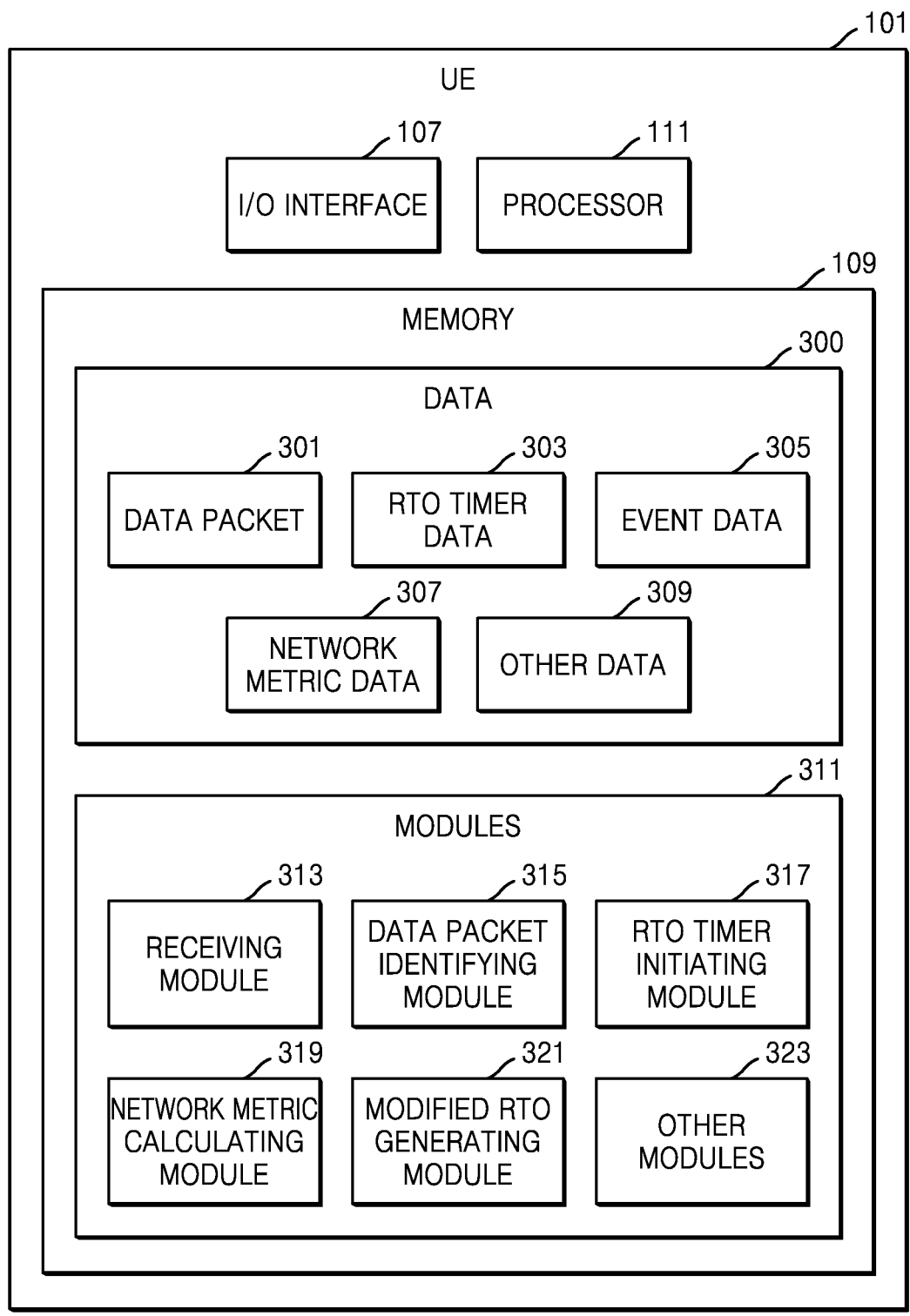
FIG. 3 is a block diagram of a UE according to an embodiment of the disclosure.

FIG. 3 is a block diagram of a UE according to an embodiment of the disclosure.

Referring to FIG. 3, the UE 101 may include the I/O interface 107, the memory 109, and the processor 111. In this case, the memory 109 may include data 300 and modules 311. However, all elements of FIG. 3 may not be essential elements of the UE 101. The UE 101 may include elements more or fewer than those illustrated in FIG. 3.

In an embodiment of the disclosure, the data 300 may include a data packet 301, RTO timer data 303, event data 305, network metric data 307, and other data 309. The data packet 301 may include data packets received from a user device 103-1. Also, the data packet 301 may include specific information about one or more missing data packets.

In an embodiment of the disclosure, the RTO timer data 303 may include specific information about an RTO time initiated for the one or more missing data packets. The specific information may include a time interval for receiving the one or more missing data packets. Also, the RTO timer data 303 may include specific information about a modified RTO timer generated based on a network metric.

In an embodiment of the disclosure, the event data 305 may include specific information about one or more events. In this case, the term "event" may refer to an arbitrary event of causing missing of a data packet. For example, the one or more events may include at least one of SL, BL, or CPL. The event data 305 may include specific information about a loss of one or more data packets that may be triggered during data transmission.

In an embodiment of the disclosure, the network metric data 307 may include specific information about the network metric calculated based on a current network state in which a plurality of data packets are transmitted. For example, the network metric may include a signal-to-interface-plus-noise (SINR) ratio, a delay incurred in an access network, and a burst reassembly delay. In an embodiment of the disclosure, the network metric may be represented as a positive integer or a negative integer.

In an embodiment of the disclosure, the other data 309 may store data including temporary data and temporary files generated by the modules 311 for performing various functions.

In an embodiment of the disclosure, the data 300 in the memory 109 may be processed by the modules 311 included in the memory 109 of the UE 101. In this case, the modules 311 may be one or more modules. In an embodiment of the disclosure, the modules 311 may be implemented as dedicated units. As described above, the term "module" may include an application integrated circuit (ASIC), an electronic circuit, a field-programmable gate array (FPGA), a programmable system-on-chip (PSoC), a combinational logic circuit, and/or other suitable elements for providing the described functions. In an embodiment of the disclosure, the modules 311 may be connected to the processor 111 to communicate with the processor 111 in order to perform one or more functions of the UE 101. When configured with the functions defined in the disclosure, the modules 311 may result in new hardware.

In an embodiment of the disclosure, the modules 311 may include a receiving module 313, a data packet identifying module 315, an RTO timer initiating module 317, a network metric calculating module 319, a modified RTO generating module 321, and other modules 323. Also, the modules 311 may include the other modules 323 to perform various miscellaneous functions of the UE 101. In an embodiment of the disclosure, the other modules 323 may include a data packet recovery module that may recover the one or more missing data packets from an end server after a dynamic RTO expires.

In an embodiment of the disclosure, the data packet recovery module may recover the one or more data packets missing based on the occurrence of the one or more events. For example, when the SL occurs, the data packet recovery module may estimate an RTO based on the network metric.

Also, when the BL occurs, the data packet recovery module may recover the one or more missing data packets based on a dynamic RTO. According to an embodiment, a state of an edge node may be provided based on a current network state for the purpose of recovery, and the dynamic RTO may be determined based on a mobility parameter. In an embodiment of the disclosure, the mobile parameter may be an access network delay and a burst reassembly delay. Also, the one or more missing data packets may be recovered based on a coordinated Snoop and ARQ retransmission.

Likewise, when the CPL occurs, the missing one or more data packets may be recovered by managing a transmission rate of a Dup ACK. The Dup ACK may be managed by determining the occurrence of a handover event and calculating a handover time when the handover event is determined. The number of transmitted TDAs may be determined based on a CWND learned by a server to be shared so that the calculated TDAs are shared before the RTO expires. Accordingly, the number of TDAs to be transmitted may be adjusted based on the handover time. In an embodiment of the disclosure, the adjusting may include tuning or controlling the number of TDAs.

In an embodiment of the disclosure, the receiving module 313 may receive at least one data packet from among a plurality of data packets transmitted by at least one user device 103-1 from among user devices. The plurality of data packets may be transmitted through a WTCP communication system.

In an embodiment of the disclosure, the data packet identifying module 315 may identify one or more data packets missing in the received plurality of data packets. According to an embodiment, the one or more data packets is missing due to the occurrence of one or more events. In an embodiment of the disclosure, the one or more events may include SL, BL, or CPL. In an embodiment of the disclosure, types of the events may be determined based on identifying the one or more missing data packets.

In an embodiment of the disclosure, the RTO timer initiating module 317 may initiate an RTO timer for receiving the one or more missing data packets until the RTO timer expires. According to an embodiment, the RTO timer may indicate a time interval for receiving the one or more missing data packets. In an embodiment of the disclosure, the time interval may be a pre-defined time interval, and may be changed based on a type of an operating system (or TCP implementation) used by the UE 101.

In an embodiment of the disclosure, the network metric calculating module 319 may calculate a network metric based on a current network state in which the plurality of data packets are transmitted. In an embodiment of the disclosure, the network metric may be a positive integer or a negative integer. In an embodiment of the disclosure, the current network state may be identified based on SINR, a received signal strength indicator (RSSI), and handover. In an embodiment of the disclosure, a network state may be dynamically changed based on the mobility of a user related to the UE 101.

In an embodiment of the disclosure, the modified RTO generating module 321 may modify the RTO timer based on the network metric calculated to receive the one or more missing data packets.

Figure 4:
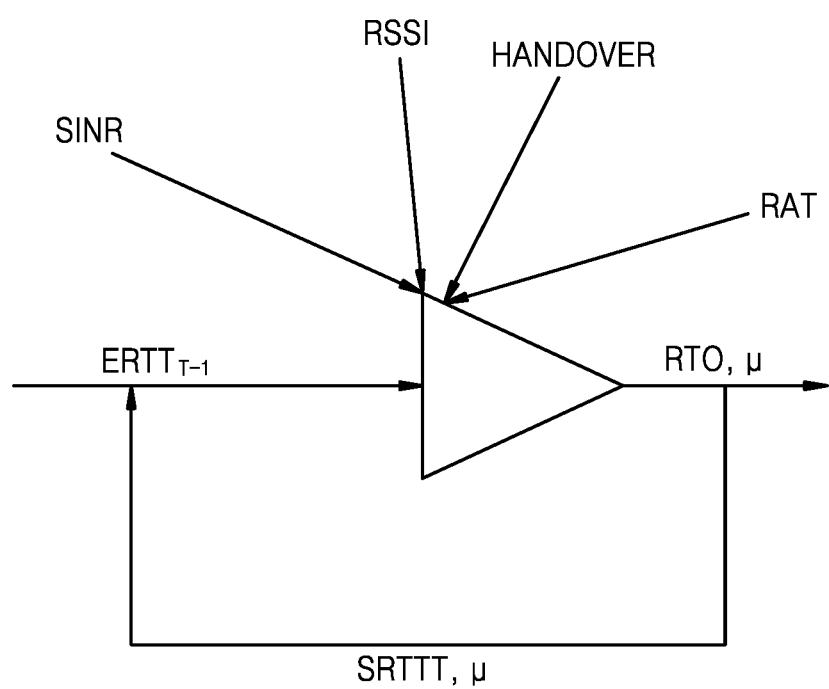
FIG. 4 is a diagram illustrating a wireless filter according to an embodiment of the disclosure.

FIG. 4 is a diagram illustrating a wireless filter according to an embodiment of the disclosure.

Referring to FIG. 4, the wireless filter may include an RTO filter. The RTO filter may be used to identify a value of an RTO timer (RTO) and a network metric (μ). In an embodiment of the disclosure, the network metric μ may provide information related to a fluctuation in a network based on an SINR ratio, an RSSI, handover, random access technology (RAT), or the like. For example, the network metric μ may include a delay incurred in an access network and a burst reassembly delay. In this case, the network metric μmay be represented as a positive integer or a negative integer. In an embodiment of the disclosure, an RTO may be more accurately estimated due to the network metric μ. In an embodiment of the disclosure, $ERTTT_{T-1}$ may denote an estimated RTT at time t−1 may be an input to the wireless filter and SRTT, may denote a smoothed RTT may be provided as a feedback.

Figure 5:
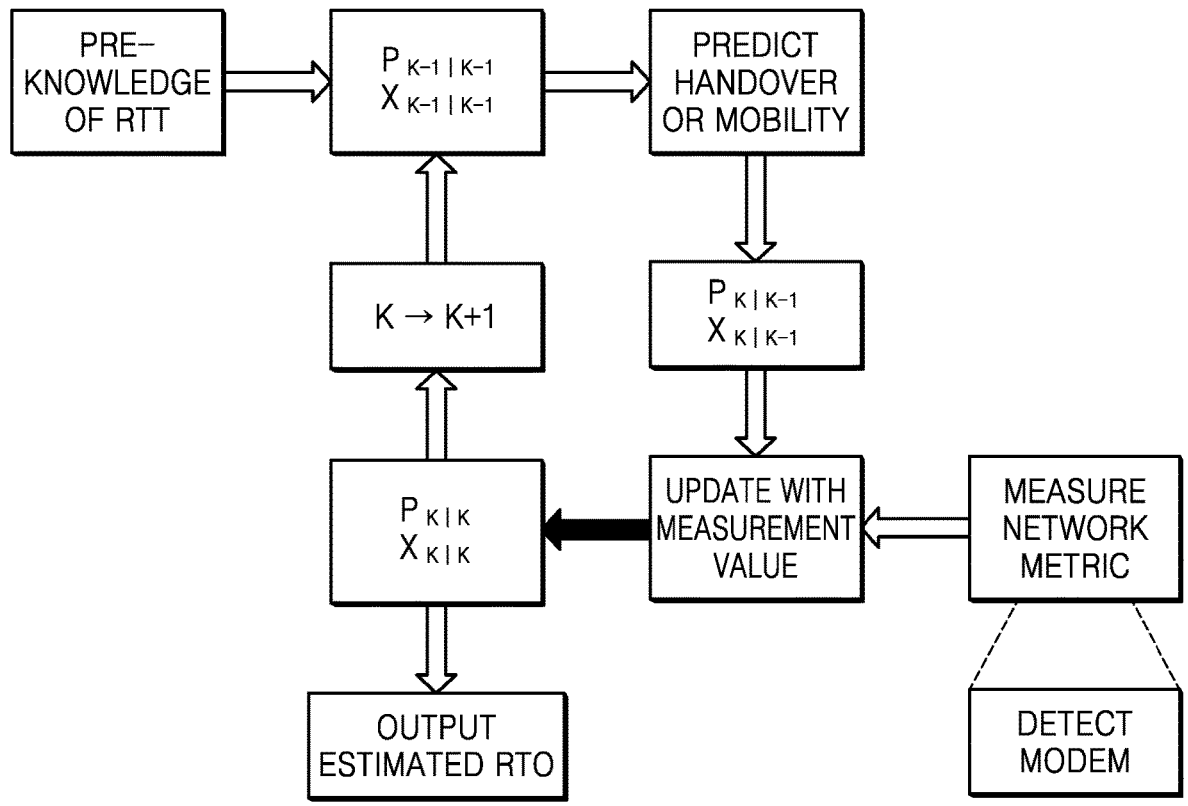
FIG. 5 is a flowchart for describing an operation of a retransmission timeout (RTO) filter according to an embodiment of the disclosure.

FIG. 5 is a flowchart for describing an operation of an RTO filter according to an embodiment of the disclosure.

FIG. 5 is a flowchart illustrating an RTO filter according to an embodiment of the disclosure. As shown in FIG. 5, the RTO filter may keep track of an estimated state of a system and a variance or uncertainty of an estimate. The estimate may be updated by using a state transition model and measurements. As shown in FIG. 5, $X_{K|K-1}$ denotes an estimate of a state of a system at a time step k before a $k^{th}$ measurement $y_k$ is considered, and $P_{K|K-1}$ denotes uncertainty of the estimate of the state of the system.

An operation of the RTO filter of FIG. 5 will be described in detail as follows. In FIG. 5, the RTO filter may estimate P and X at a $k^{th}$ time by using a previous RTT. The RTO filter may predict handover or mobility of the UE 101 in a state $X_{K-1|K-1}$ of a system and uncertainty $P_{K-1|K-1}$ at a time k−1. Through the prediction, the RTO filter may obtain a state $X_{K|K-1}$ of the system and uncertainty $P_{K|K-1}$ at a time k. Also, the RTO filter may measure a network metric through modem detection. Next, the RTO filter may update the state $X_{K|K-1}$ of the system and the uncertainty $P_{K|K-1}$ at the time k with a measurement value. That is, the RTO filter may update the state $X_{K|K-1}$ of the system and the uncertainty $P_{K|K-1}$ at the time k based on the measured network metric. Through the updating, the RTO filter may obtain a state $X_{K|K}$ of the system and uncertainty $P_{K|K}$ considering a $k^{th}$ measurement $y_k$. The RTO filter may output an RTO estimated by using the state $X_{K|K}$ of the system and the uncertainty $P_{K|K}$, may change the time k to k+1, and may perform again an algorithm of FIG. 5.

Figure 6:
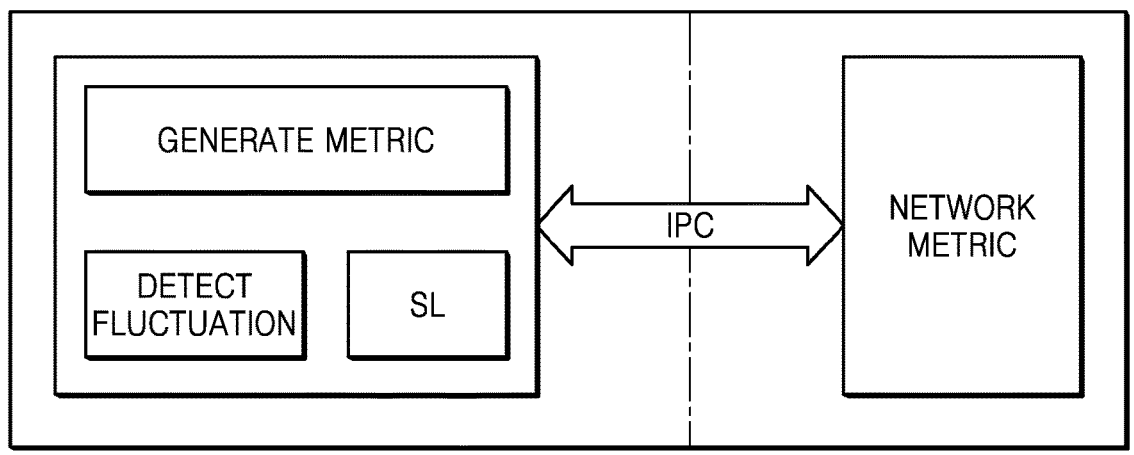
FIG. 6 is a diagram related to spurious loss (SL) according to an embodiment of the disclosure.

FIG. 6 is a diagram related to SL according to an embodiment of the disclosure.

Referring to FIG. 6, when SL occurs, an RTO may be estimated based on a network metric. In an embodiment of the disclosure, the network metric may provide information related to a fluctuation in a network based on an SINR ratio or an RSSI. The RTO may be more accurately estimated due to the network metric. In an embodiment of the disclosure, a metric generating operation, a fluctuation detecting operation, and an SL detecting operation may be performed by a cellular processor (CP) included in the UE 101. Also, a network metric generating operation may be performed by an application processor (AP) included in the UE 101. An operation of the UE 101 including the CP and the AP will be described in detail as follows.

In an embodiment of the disclosure, the UE 101 may identify the occurrence of an SL event. Also, the UE 101 may detect a fluctuation. For example, the UE 101 may obtain information about a network metric through inter-process communication (IPC), and then may detect a fluctuation in a network state. Also, the UE 101 may generate a metric. For example, the metric may be represented by p, and p may be determined based on X and Y. In an embodiment of the disclosure, X may denote a value determined by a delay incurred in an access network, and Y may denote a value determined by a burst reassembly delay.

Figure 7:
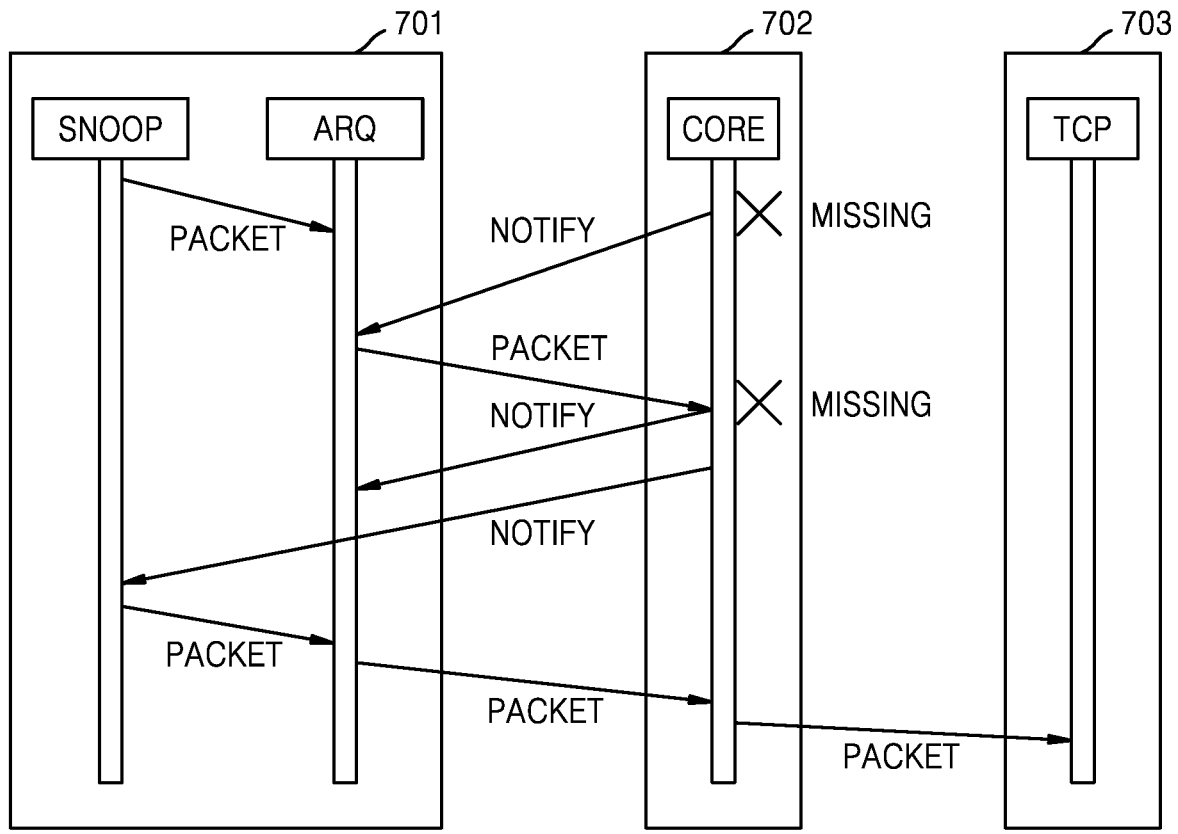
FIG. 7 is a sequence diagram illustrating an example where, when burst loss (BL) occurs, missing data packets are recovered according to an embodiment of the disclosure.

FIG. 7 is a sequence diagram illustrating an example where, when BL occurs, missing data packets are recovered according to an embodiment of the disclosure. In FIG. 7, a Snoop and ARQ block 701, a core block 702, and a TCP block 703 may be included in the UE 101, and may indicate different layers. In FIG. 7, a movement of a data packet may be marked by an arrow.

Referring to FIG. 7, the sequence diagram of FIG. 7 illustrates a state in which a burst of packets are lost or delayed due to the mobility of the UE 101. Because a modem may notify a mobility state to a TCP stack in this state, the TCP stack may further wait a 2X+2Y time in addition to a previous RTO. Accordingly, $RTTVAR_t$ at a time t may be calculated as shown in <Equation 1>.

$$RTTVAR_t = (1-\beta)RTTVAR_{t-1} + \beta|SRTT - ERTT| + (2X + 2Y)$$ [Equation 1]

In <Equation 1>, $RTTVAR_t$ may denote a variance of a round trip time (RTT) at a time t, $RTTVAR_{t-1}$ may denote a variance of an RTT at a time t−1, SRTT may denote a smoothed RTT, ERTT may denote an estimated RTT, β may be generally ¼, X may denote a delay incurred in an access network, and Y may denote a burst reassembly delay. In an embodiment of the disclosure, 2X+2Y may be represented by μ.

In an embodiment of the disclosure, even when a network is not congested, retransmission may occur due to the mobility of the UE 101. In an embodiment of the disclosure, the modem may provide an edge cell condition proactively based on previous mobility or reactively according to a current condition. In an embodiment of the disclosure, a dynamic timer based on mobility may be determined, and packets may be recovered by using a coordinated Snoop, ARQ, and TCP recovery method. Because lower layer recovery involves abstraction in a TCP layer, a CWND at a server side may not be reduced.

In an embodiment of the disclosure, a method of setting an RTO based on coordinated Snoop and ARQ is as follows. First, a burst of packets may be lost or delayed due to the mobility of the UE 101. Next, the modem may notify a mobility condition to the TCP stack, and the TCP stack may further wait a 2X+2Y time in addition to a previous RTO time. In an embodiment of the disclosure, Snoop and ARQ level retransmission may occur, and thus data packets may be recovered. In an embodiment of the disclosure, when loss of actual packets occurs, lost data packets may be recovered from an end server after a timeout.

In an embodiment of the disclosure, when handover occurs from a 5G area in which the UE 101 operates in a millimeter wave (mmWave) band to an LTE area, BL may occur. In this condition, a legacy RTO may take 20 seconds to 30 seconds or more to adapt to the handover. In contrast, the UE 101 according to an embodiment of the disclosure may avoid unnecessary retransmission of an ACK packet by applying a shift in a signal area within 1 to 2 seconds.

According to an embodiment, when CPL occurs, data packets may be recovered based on at least one of a controlled Dup ACK filter method, a probe-based method, or a CPL probe method.

Figure 8:
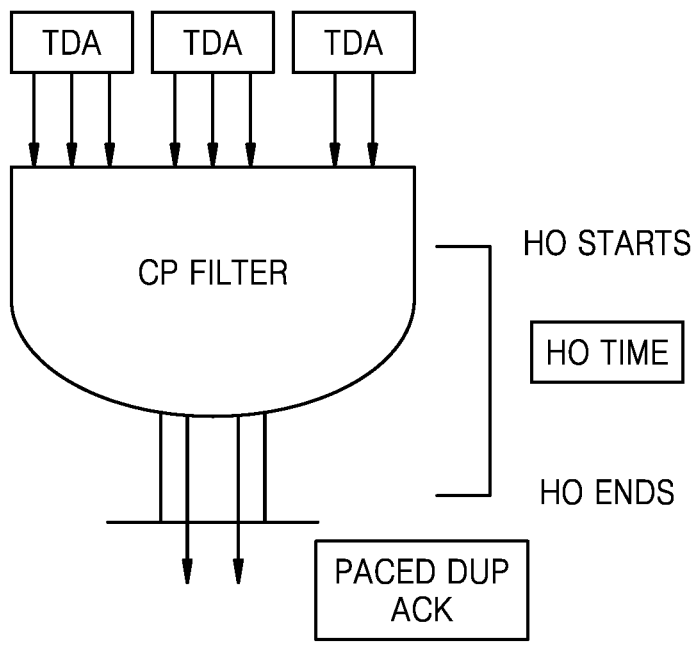
FIG. 8 is a diagram illustrating an example where, when consecutive packet loss (CPL) occurs, missing data packets are recovered by using a filter method according to an embodiment of the disclosure.

FIG. 8 is a diagram illustrating an example where, when CPL occurs, missing data packets are recovered by using a filter method according to an embodiment of the disclosure.

Referring to FIG. 8, when CPL occurs, a CP filter may recover one or more missing data packets by managing a transmission rate of a Dup ACK. The Dup ACK may be managed by determining the occurrence of a handover event and calculating a handover time when the handover event is determined. In an embodiment of the disclosure, the number of TDAs transmitted to the CP filter may be determined based on a CWND learned by a server so the calculated TDAs are shared before an RTO expires. Accordingly, the number of TDAs to be transmitted may be adjusted based on the handover time. In an embodiment of the disclosure, the adjusting may include tuning or controlling the number of TDAs.

Unlike other loss events, when handover occurs with the UE 101, packets may be consecutively lost. In this case, because the loss is non-sporadic, the packets may be recovered in the server. An operation of the CP filter of FIG. 8 will be described in detail as follows.

The CP filter may detect that a handover (HO) event has occurred. Accordingly, the CP filter may calculate a handover time that is an interval from a time when handover starts to a time when the handover ends. In an embodiment of the disclosure, a filter-based method may be used to pace Dup ACKs. For instance, the filter-based method may be used to control the frequency of the Dup ACKs. In an embodiment of the disclosure, the CP filter may recognize a CWND at a server side, and may pace TDAs. For instance, the filter-based method may be used to control the frequency of the TDA. The CP filter may check whether the TDAs are shared before a timeout occurs, and may execute the server by exponentially reducing the TDAs. Although the paced Dup ACKs are simultaneously output from the CP filter in FIG. 8, the disclosure is not limited thereto. That is, the paced Dup ACKs may not be simultaneously output from a filter and may be output in different orders.

Figure 9:
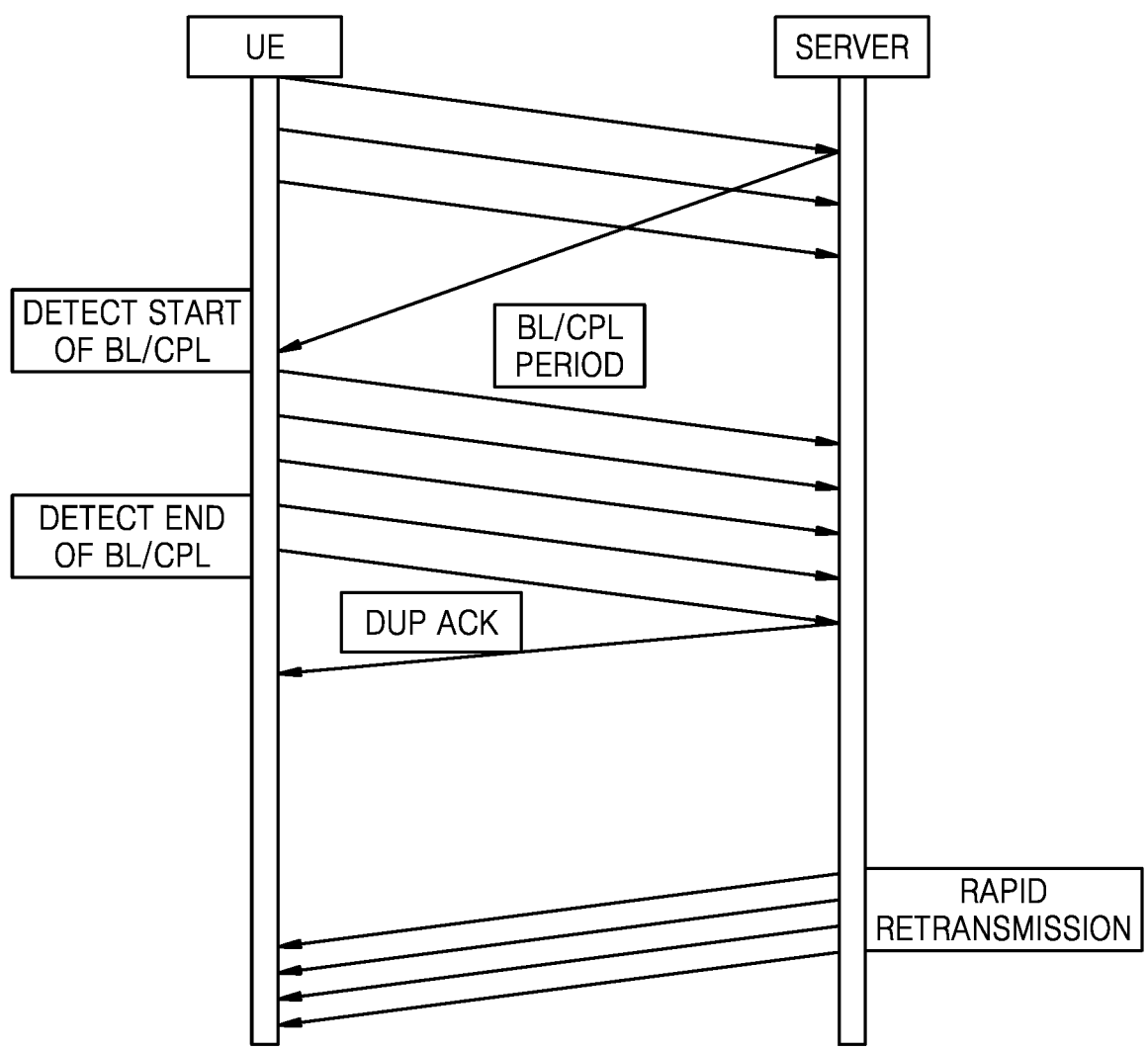
FIG. 9 is a sequence diagram illustrating an example where, when CPL occurs, missing data packets are recovered by using a probe method according to an embodiment of the disclosure.

FIG. 9 is a sequence diagram illustrating an example where, when CPL occurs, missing data packets are recovered by using a probe method according to an embodiment of the disclosure.

Referring to FIG. 9, the UE 101 may initially detect the start of BUCPL. Next, information about the detection of the BL/CPL may be signaled to a server. In this condition, the server may halt or store processing of a network metric or a TCP metric such the network metric or the TCP metric from before the signaling of the detection of the BL/CPL is maintained. In an embodiment of the disclosure, the halting may mean that a value is frozen for a short time. In this case, although the value is not stored as an external value, the value may not decrease or increase during probing. Also, the UE 101 may halt or store processing of a network parameter such as an RTO, an SRTT, a receiver window (RWND), a next expected sequence number, or an ACK number. For example, when a CWND value is 200, a slow-start threshold (SSTHRESH) value may be 250, the CWND and SSTHRESH values may be stored, and processing may be halted until the probing succeeds.

In an embodiment of the disclosure, probed data packets may hit or drop an Internet control message protocol (ICMP) message until data packets are recovered and a success probe ACK is received. In this condition, the server may restore data packets by using previous values and may start rapid recovery by rapidly retransmitting lost data packets.

Operations of the UE 101 and the server of FIG. 9 will be described as follows. First, the UE 101 may detect the start of BUCPL. Next, the UE 101 may signal information about the BL/CPL to the server. In this case, signaling from the UE 101 to the server may mean transmission of a probe packet. In an embodiment of the disclosure, the information about the BL/CPL may include information about a period of the BL/CPL. After the signaling, the server may recognize that the UE 101 is in a BL/CPL phase. The server may halt or store processing of a TCP metric before the signaling. In this case, the halting of the processing of the TCP metric may mean that a TCP metric value is frozen without being changed for a specific time.

In an embodiment of the disclosure, the UE 101 may also halt or store processing of a client-side parameter. For example, the client-side parameter may be an RTO, an SRTT, an RWND, a next expected sequence number, or an ACK. For example, a CWND value may be 200, an SSTHRESH value may be 250, and the values may be stored until a probing operation succeeds. The UE 101 may detect the end of the BL/CPL, and a success probe ACK (DUP ACK) may be received from the server. The server may perform data retransmission for rapid recovery by using the stored values.

Figure 10:
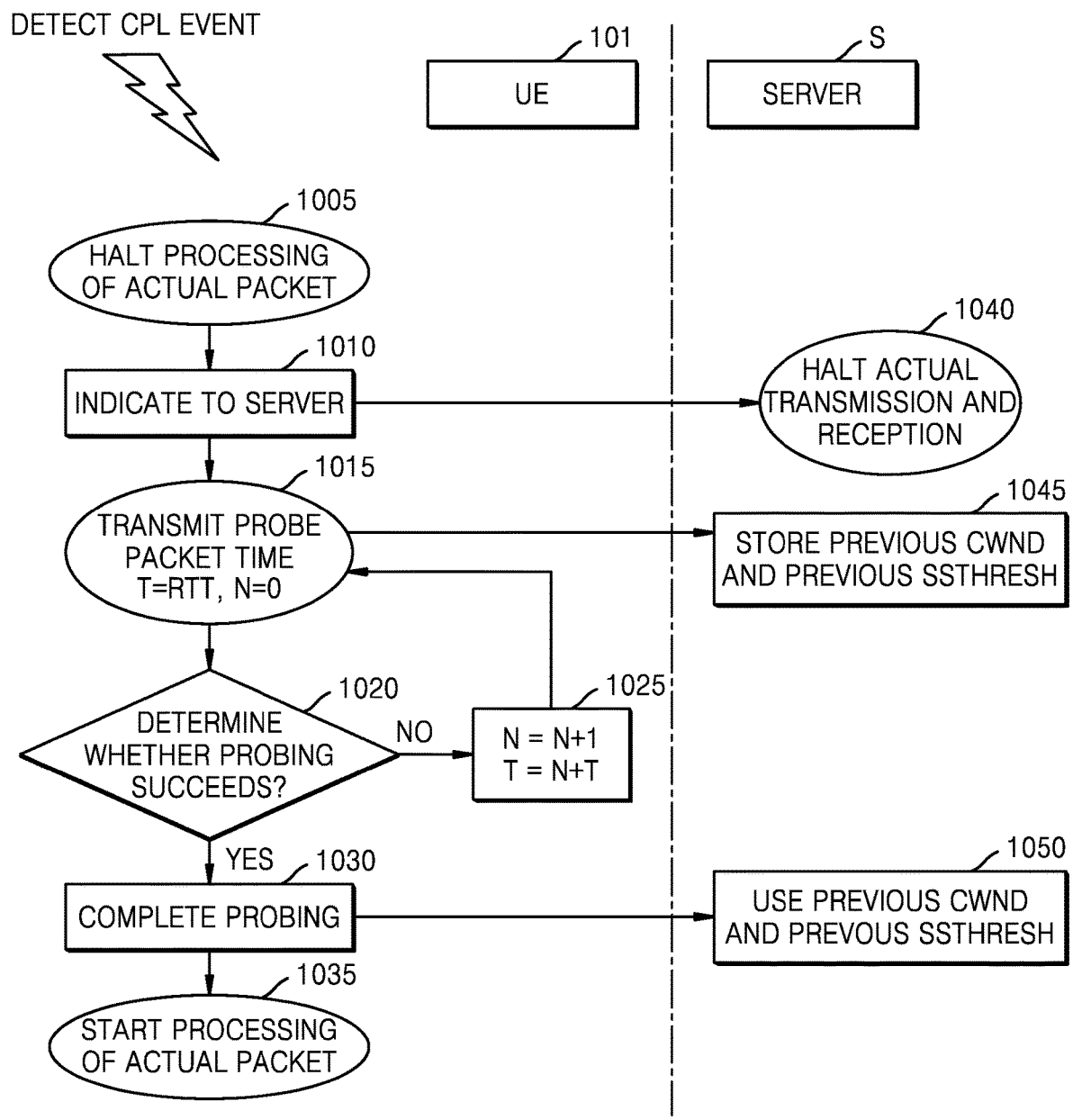
FIG. 10 is a flowchart illustrating an example where, when CPL occurs, missing data packets are recovered by using a probe method according to an embodiment of the disclosure.

FIG. 10 is a flowchart where, when CPL occurs, missing data packets are recovered by using a probe method according to an embodiment of the disclosure. In FIG. 10, a server may be a transmitting end that transmits a data packet in a wireless TCP communication network and the UE 101 may be a receiving end that receives the data packet, but the disclosure is not limited thereto.

Referring to FIG. 10, the UE 101 may detect a CPL event. That is, the UE 101 may detect the occurrence of the CPL event during reception of a data packet from the server.

In operation 1005, the UE 101 may halt processing of an actual packet. For example, when the CPL event is detected, the UE 101 may halt, as a receiving end, an original session that receives data from the server.

In operation 1010, the UE 101 may indicate to the server. For example, the UE 101 may indicate to the server that the CPL event is detected. In response, in operation 1040, the server may halt actual transmission and reception (TX/RX).

In operation 1015, the UE 101 may transmit a probe packet time T. That is, the UE 101 may transmit a probe packet as a transmitter in a session independent from the original session. In an embodiment of the disclosure, the probe packet time T may be an RTT. In this case, an index N may be 0. In operation 1045, the server may store a previous CWND and a previous SSTHRESH.

In operation 1020, the UE 101 may determine whether probing succeeds. For example, the UE 101 may receive an ACK for the transmitted probe packet from the server, and may determine whether probe packet transmission succeeds. For example, when the UE 101 does not receive an ACK related to the probe packet transmission, the UE 101 may determine that the probe packet transmission fails and may perform operation 1025.

In operation 1025, the UE 101 may update the probe packet time T to N+T. Also, the UE 101 may update the index N to N+1. When the UE 101 receives the ACK related to the probe packet transmission, the UE 101 may determine that the probe packet transmission succeeds and may perform operation 1030.

In operation 1030, the UE 101 may determine that the probing is completed. That is, after the UE 101 determines that the probe packet transmission succeeds, the UE 101 may determine that the probe packet transmission is completed. In response, in operation 1050, the server may use the previous CWND and the previous SSTHRESSH.

In operation 1035, the UE 101 may start processing of an actual packet. That is, the UE 101 may receive an actual data packet from the server in the original session.

Figure 11:
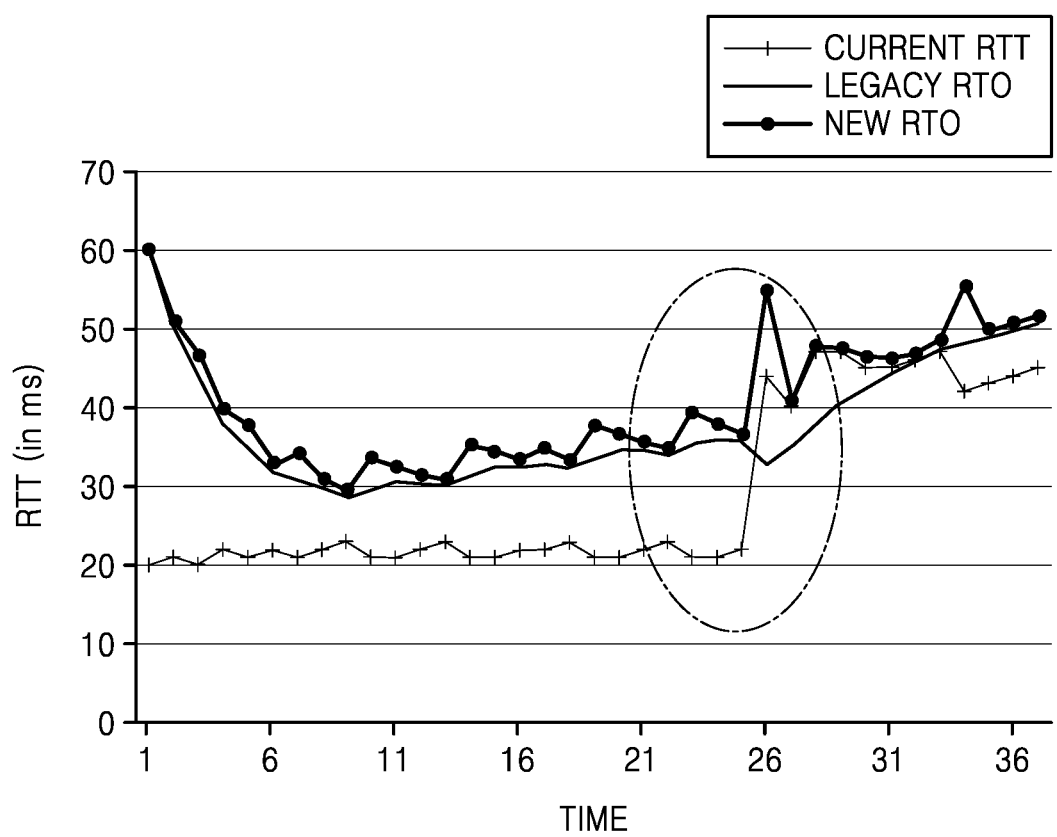
FIG. 11 is a graph showing performance related to an RTO setting when BL occurs according to an embodiment of the disclosure.

FIG. 11 is a graph showing performance related to an RTO setting when BL occurs according to an embodiment of the disclosure.

Referring to FIG. 11, the graph of FIG. 11 may show a case where the UE 101 related to a user moves from a good signal area to a weak signal area. For example, the case of FIG. 11 may be a case where handover occurs from a 5G area where the UE 101 operates in a millimeter wave (mmWave) band to an LTE area. In this condition, a legacy RTO may take a time 20 seconds to 30 seconds or more to adapt to the handover. In contrast, the UE 101 according to an embodiment of the disclosure may avoid unnecessary retransmission of an ACK packet by applying a shift in a signal area within 1 to 2 seconds. Also, when CPL occurs, data packets may be recovered based on at least one of a controlled Dup ACK filter method, a probe-based method, or a CPL probe method.

Figure 12:
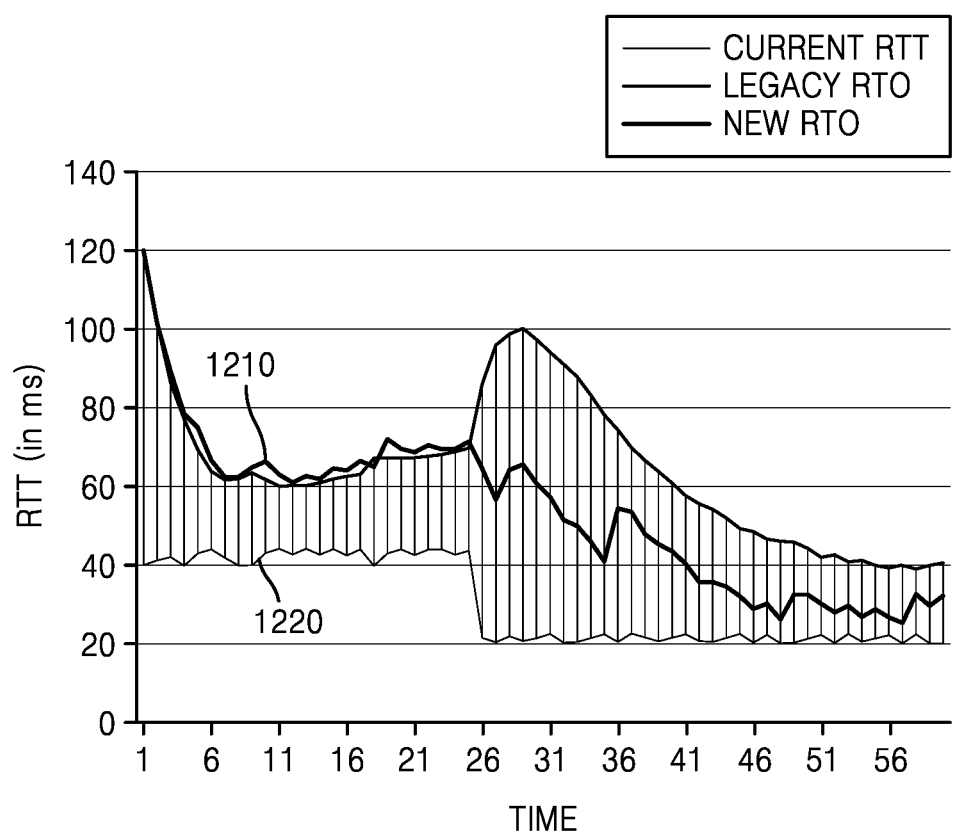
FIG. 12 is a graph showing performance related to an RTO setting when CPL occurs according to an embodiment of the disclosure.

FIG. 12 is a graph showing performance related to an RTO setting when CPL occurs according to an embodiment of the disclosure.

Referring to FIG. 12, the graph of FIG. 12 shows a case where the UE 101 related to a user moves from a weak signal area to a good signal area. In this condition, the UE 101 may apply a modified RTO. As shown in FIG. 11, a new RTO graph 1210 related to the UE 101 according to the disclosure may be closer to a graph 1220 related to a current RTT than a graph related to a legacy RTO. Accordingly, when actual loss occurs, the UE 101 may more rapidly adapt to a situation by using a modified new RTO.

Figure 13:
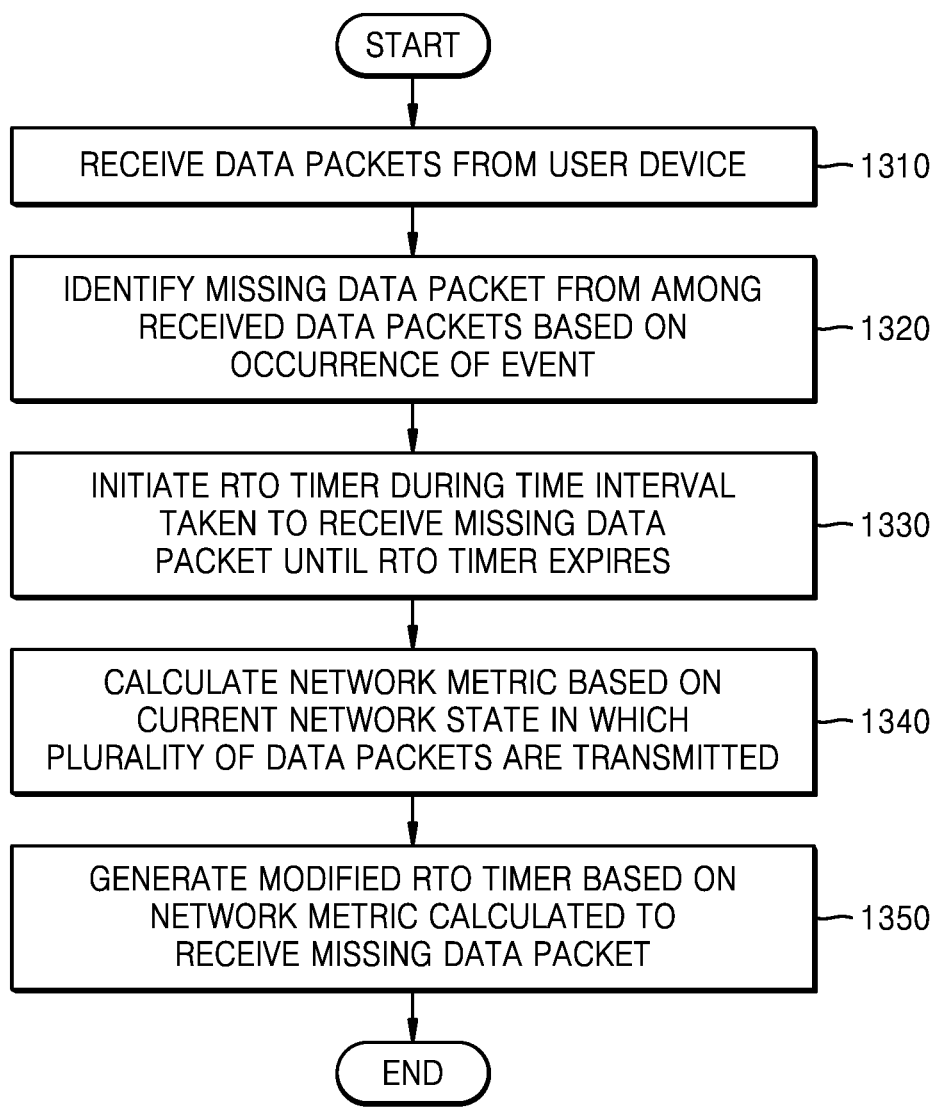
FIG. 13 is a flowchart illustrating an operation method of a UE according to an embodiment of the disclosure.

FIG. 13 is a flowchart illustrating an operation method of a UE 101 according to an embodiment of the disclosure. In FIG. 13, the UE 101 may be a receiving end that receives a data packet in a wireless TCP communication network. Also, a TCP user device may be a transmitting end that transmits a data packet.

Referring to FIG. 13, in operation 1310, the UE 101 may receive data packets from a TCP user device. That is, the UE 101 may receive at least one data packet from among a plurality of data packets transmitted by the TCP user device. In an embodiment of the disclosure, the at least one data packet may be received by the receiving module 313 included in the UE 101.

In operation 1320, the UE 101 may identify a missing data packet from among the received data packets. According to an embodiment, the data packet is missing due to the occurrence of an event. In an embodiment of the disclosure, the event that may cause the data packet to be missing may include SL, BL, or CPL. In an embodiment of the disclosure, the missing data packet may be identified by the data packet identifying module 315 included in the UE 101.

In operation 1330, the UE 101 may initiate an RTO timer for receiving the missing data packet until the RTO timer expires. The RTO timer may indicate a time interval for receiving the missing data packet. In an embodiment of the disclosure, the RTO timer may be generated and initiated by the RTO timer initiating module 317 included in the UE 101.

In operation 1340, the UE 101 may calculate a network metric based on a current network state in which the plurality of data packets are transmitted. In an embodiment of the disclosure, the network metric may be calculated by the network metric calculating module 319 included in the UE 101.

In operation 1350, the UE 101 may generate a modified RTO timer based on the calculated network metric in order to receive the missing data packet. In an embodiment of the disclosure, the modified RTO timer may be generated by the modified RTO generating module 321 included in the UE 101. The UE 101 may wait for retransmission of the missing data packet from the server during a modified RTO timer time. Due to the modified RTO timer, transmission/reception of data packets may be optimized in a wireless TCP communication system.

The method of FIG. 13 may be described as general context of computer-executable instructions. In general, computer-executable instructions may perform specific functions, or may include routines, programs, objects, components, data structures, procedures, modules, and functions that realize specific abstract data types. An order in which the method of FIG. 13 is described may not be intended to be construed as limiting, and an arbitrary number of method blocks may be combined in an arbitrary order to perform the method. Also, individual blocks may be removed from the methods without departing from the scope of the subject matter described in the disclosure. Also, the method may be implemented as arbitrary appropriate hardware, software, firmware, or a combination thereof.

Figure 14:
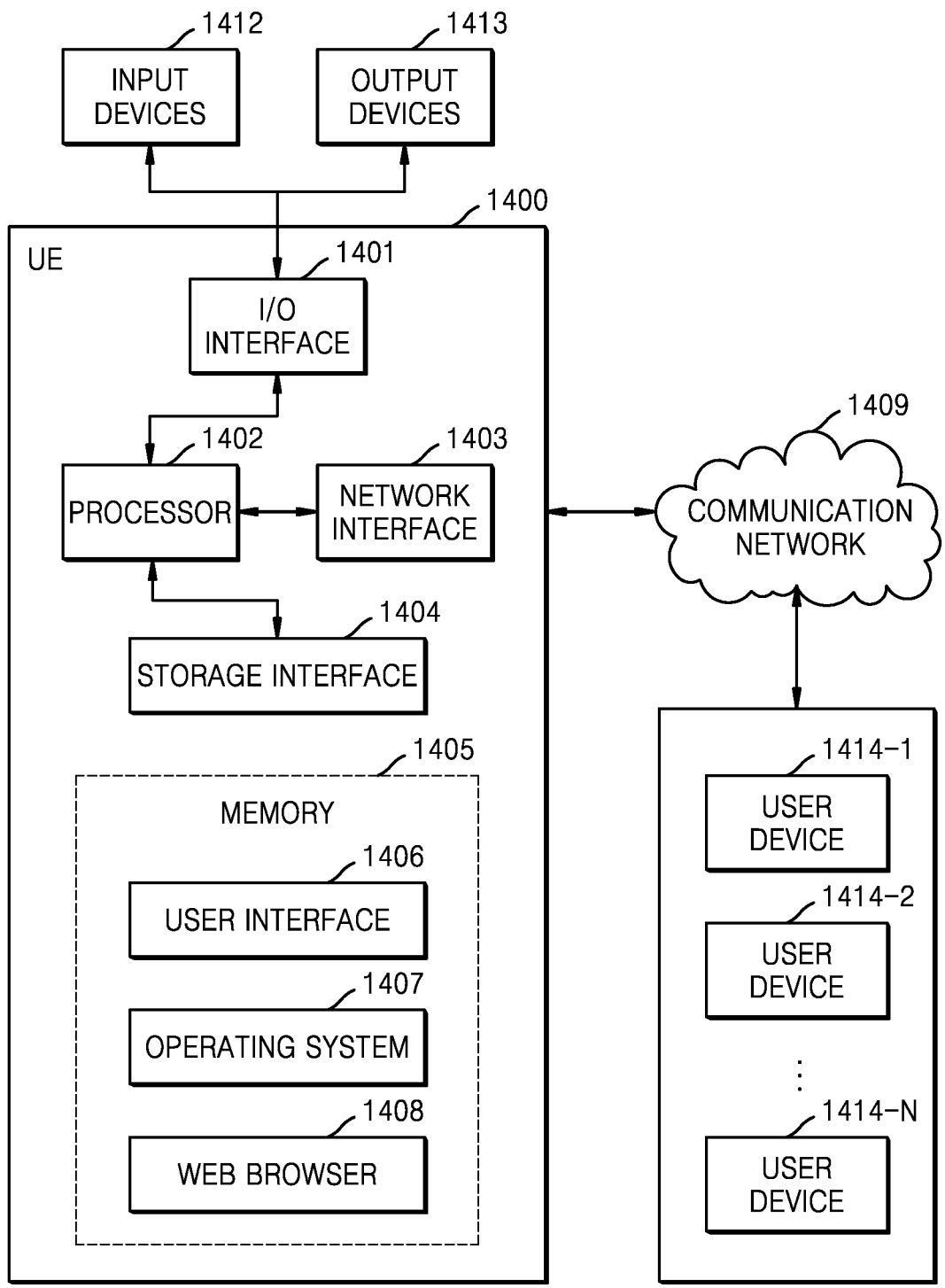
FIG. 14 is a detailed block diagram illustrating a UE according to an embodiment of the disclosure.

FIG. 14 is a detailed block diagram illustrating a UE 1400 according to an embodiment of the disclosure. A UE 1400 of FIG. 14 may be the UE 101 of FIG. 1A, a communication network 1409 of FIG. 14 may be the communication network 105 of FIG. 1A, and a user device 1414-1, a user device 1414-2, and a user device 1414-N (hereinafter, referred to as user devices 1414) of FIG. 14 may be user devices 103-1, 103-2 and 103-N, respectively of FIG. 1A.

Referring to FIG. 14, the UE 1400 may include a CPU or a processor 1402. The processor 1402 may include at least one data processor for optimizing transmission of data packets in a wireless TCP communication system. The processor 1402 may include specialized processing units such as an integrated system (bus) controller, a memory management control unit, a floating point unit, a GPU, and a digital signal processing unit.

The processor 1402 may be located to communicate with one or more input/output devices (not shown) through an I/O interface 1401. The I/O interface 1401 may support communication protocols or methods such as, but not limited to, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antenna, S-video, video graphics array (VGA), IEEE 802.n/b/g/n/x, Bluetooth, and cellular (e.g., code-division multiple access (CDMA), high-speed packet access (HSPA+), global system for mobile communications (GSM), long-term evolution (LTE), or WiMax).

The UE 1400 may communicate with one or more input/output devices by using the I/O interface 1401. For example, input devices 1412 may include an antenna, a keyboard, a mouse, a joystick, an (infrared) remote controller, a camera, a card reader, a fax machine, a dongle, a biometric reader, a microphone, a touchscreen, a touchpad, a trackball, a stylus, a scanner, a storage device, a transceiver, and a video device/source. Output devices 1413 may include a printer, a fax machine, a video display (e.g., a cathode ray tube (CRT), a liquid crystal display (LCD), a light-emitting diode (LED), a plasma, a plasma display panel (PDP), or an organic light-emitting diode display (OLED)), and an audio speaker.

The processor 1402 may be located to communicate with the communication network 1409 through a network interface 1403. The network interface 1403 may communicate with the communication network 1409. The network interface 1403 may use, but is not limited to, direct connect, Ethernet (e.g., twisted pair 10/100/1000 Base T), transmission control protocol/Internet protocol (TCP/IP), token ring, and IEEE 802.11a/b/g/n/x. The communication network 1409 may include, but is not limited to, a direct interconnection, a local area network (LAN), a wide area network (WAN), a wireless network (e.g., using WAP), and the Internet. The UE 1400 may communicate with the user devices 1414 such as the user device 1414-1, the user device 1414-2, and the user device 1414-N by using the network interface 1403 and the communication network 1409. The network interface 1403 may use connection protocols including, but not limited to, direct connect, Ethernet (e.g., twisted pair 10/100/1000 Base T), TCP/IP, token ring, and IEEE 802.11a/b/g/n/x.

The communication network 1409 may include, but is not limited to, a direct interconnection, an e-commerce network, a peer-to-peer (P2P) network, a LAN, a WAN, a wireless network (e.g., using WAP), the Internet, and Wi-Fi. Each of a first network and a second network may be a dedicated network, or may be a shared network that represents an association of different types of networks using various protocols such as hypertext transfer protocol (HTTP), TCP/IP, and WAP co communicate each other. Also, the first network and the second network may include various network devices including routers, bridges, servers, a computing devices, storage devices, etc.

In an embodiment of the disclosure, the processor 1402 may be located to communicate with a memory 1405 (e.g., a random-access memory (RAM) or a read-only memory (ROM), not shown in FIG. 14) through a storage interface 1404. The storage interface 1404 may use connection protocols such as, but not limited to, serial advanced technology attachment (SATA), integrated drive electronics (IDE), IEEE-1394, USB, fiber channel, and small computer systems interface (SCSI), and may be connected to the memory 1405 including a memory drive and a removable disc drive (memory disc drive). The memory drive may include a drum, a magnetic disc drive, a magneto-optical drive, an optical drive, a redundant array of independent discs (RAID), a solid state memory device using a semiconductor, and a drive using a semiconductor.

The memory 1405 may store a collection of program or database components including, but not limited to, a user interface 1406 and an operating system 1407. In an embodiment of the disclosure, the UE 1400 may store user/application data such as data, variables, and records as described in the disclosure. Such databases may be implemented as fault-tolerant, relational, scalable, secure databases such as Oracle or Sybase.

The operating system 1407 may facilitate resource management and operation of the UE 1400. Examples of the operating system may include, but are not limited to, Apple Macintosh OS X, Unix, Unix-like system distributions (e.g., Berkeley Software Distribution (BSD), FreeBSD, NetBSD, and OpenBSD), Linux distributions (e.g., Red Hat, Ubuntu, and Kubuntu), IBM OS/2, Microsoft Windows (e.g., XP, Vista/7/8, 10 etc.), Apple iOS, Google Android, and Blackberry OS.

In an embodiment of the disclosure, the UE 1400 may implement a web browser 1408 as a stored program component. The web browser 1408 may be a hypertext viewing application such as Microsoft Internet Explorer, Google Chrome, Mozilla Firefox, or Apple Safari. Secure web browsing may be provided by using hypertext transport protocol (HTTPS), secure sockets layer (SSL), or transport layer security (TLS). The web browser 1408 may use functions such as AJAX, DHTML, Adobe Flash, JavaScript, Java, and application programming interfaces (APIs). In some embodiments of the disclosure, the UE 101 may implement a mail server stored in a program component. The mail server may be an Internet mail server such as Microsoft Exchange. The mail server may use functions such as ASP, ActiveX, ANSI C++/C #, Microsoft, NET, CGI scripts, Java, JavaScript, PERL, PHP, Python, and WebObjects. The mail server may use communication protocols such as Internet message access protocol (IMAP), messaging application programming interface (MAPI), Microsoft exchange, post office protocol (POP), and simple mail transfer protocol (SMTP). In some embodiments of the disclosure, the UE 1400 may implement a mail client stored in a program component. The mail client may be a mail viewing application such as Apple Mail, Microsoft Entourage, Microsoft Outlook, or Mozilla Thunderbird.

However, all elements of FIG. 14 may not be essential elements of the UE 1400. The UE 1400 may include elements more or fewer than those illustrated in FIG. 14.

According to an embodiment, A Snoop method used to recover a missing data packet will be described as follows. Snoop may refer to a protocol that maintains un-acknowledged TCP segment information in a BS. In an embodiment of the disclosure, an ARQ Snoop agent may be a software module designed for the exploitation of a link layer AQR scheme by TCP in a wireless LAN environment. The software module may operate in a protocol stack between the TCP and MAC layers.

According to an embodiment, two mechanisms such as packet loss detection and packet loss concealment in a wireless network (dropping a duplicate packet in a BS) may need to be modified in both a UE and a BS.

In an embodiment of the disclosure, WTCP may adjust Snoop to move from the BS to the UE. A method according to an embodiment of the disclosure may shield a transmitter from a congestion loss event by calculating a Snoop timer and discarding retransmission due to a wireless transmission error.

In an embodiment of the disclosure, a user device that is a transmitter may be shielded from a wireless link error. Also, according to an embodiment of the disclosure, link layer overhead may be eliminated. Also, an embodiment of the disclosure may be an event-based and may require very small power consumption. An embodiment of the disclosure may provide a solution for optimizing data transmission at a UE level, and thus may eliminate the need for any modification in a BS or another network entity. The disclosure may be embodied as a recording medium including instructions that may be executed in computers, e.g., a program module executed in computers. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, and other data. The communication medium may generally include computer-readable instructions, a data structure, a program module, or other data of a modulated data signal.

In the disclosure, the term "computer program product" or "computer-readable medium" is used to generally refer to a medium such as a memory, a hard disc installed in a hard disc drive, or a signal. The "computer program products" or the "computer-readable recording media" provide, to a computer system, software including instructions for setting a length of a timer for receiving a missing data packet based on a network metric corresponding to a determined event according to the disclosure.

Also, the term "unit" or "module" used herein may be a hardware component such as a processor or a circuit and/or a software component executed in a hardware component such as a processor.

The term " . . . unit" or " . . . module" may be stored in an addressable storage medium as a program executable on a processor. For example, " . . . unit" or " . . . module" may include any one or more of constituent elements such as software constituent elements, object-oriented software constituent elements, class constituent elements, and task constituent elements, processes, functions, attributes, procedures, sub-routines, segments of program code, drivers, firmware, microcode, circuits, data, databases, data structures, tables, arrays, and variables.

The particular implementations shown and described herein are illustrative examples of the disclosure and are not intended to otherwise limit the scope of the disclosure in any way. For the sake of brevity, conventional electronics, control systems, software development, and other functional aspects of the systems may not be described in detail.

Throughout the disclosure, the expression "at least one of a, b or c" indicates only a, only b, only c, both a and b, both a and c, both b and c, all of a, b, and c, or variations thereof.

While the embodiments of the disclosure have been particularly shown and described, it will be understood by one of ordinary skill in the art that various changes in form and details may be made therein without departing from the spirit and scope of the disclosure as defined by the following claims. Hence, it will be understood that the embodiments of the disclosure described above are not limiting of the scope of the disclosure. For example, each component described in a single type may be executed in a distributed manner, and components described distributed may also be executed in an integrated form.

The scope of the disclosure is not defined by the detailed description of the disclosure but by the claims, and all modifications or alternatives derived from the scope and spirit of the claims and equivalents thereof fall within the scope of the disclosure.

What is claimed is:

1. An operation method of a terminal for transmitting and receiving data in a wireless communication system, the operation method comprising:
   identifying at least one missing data packet from among a plurality of data packets transmitted from an external device;
   identifying an event corresponding to the at least one missing data packet, wherein the event comprises at least one of spurious loss (SL), burst loss (BL), or consecutive packet loss (CPL); and
   setting a time period for receiving the at least one missing data packet based on a network metric data corresponding to the identified event,
   wherein the setting the time period comprises:
   when the event is identified to be the SL, setting a length of the time period based on the network metric data corresponding to the SL, wherein the network metric data corresponding to the SL comprises at least one of an estimated smooth round trip time (SRTT) or a round trip time variance (RTTVAR).

2. The operation method of claim 1, wherein the setting the time period further comprises:
   when the event is identified to be the BL, identifying a state of an edge node corresponding to a network state of the terminal; and
   setting a length of the time period based on at least one of the identified state of the edge node or a mobility parameter.

3. The operation method of claim 2, further comprising receiving the at least one missing data packet during the set the time period, based on a coordinated Snoop and automatic repeat request (ARQ) retransmission.

4. The operation method of claim 1, further comprising, when the event is identified to be the CPL, controlling a transmission rate of a duplicate acknowledgement (Dup ACK) transmitted from the terminal to the external device.

5. The operation method of claim 4, wherein the controlling of the transmission rate of the Dup ACK comprises:
   identifying occurrence of handover of the terminal;
   calculating a time required for performing the handover; and
   adjusting a number of triple Dup ACKs (TDAs) based on the calculated time.

6. The operation method of claim 1, further comprising receiving the at least one missing data packet from the external device during the set time period.

7. The operation method of claim 6, wherein the receiving of the at least one missing data packet further comprises:
   when the event is identified to be the BL or the CPL, transmitting a probe packet to the external device; and
   receiving the at least one missing data packet retransmitted from the external device, after receiving an ACK for the transmitted probe packet.

8. A terminal for transmitting and receiving data in a wireless communication system, the terminal comprising:
   a memory storing one or more instructions; and
   at least one processor configured to execute the one or more instructions stored in the memory to: identify at least one missing data packet from among a plurality of data packets transmitted from an external device,
   identify an event corresponding to the at least one missing data packet, wherein the event comprises at least one of spurious loss (SL), burst loss (BL), or consecutive packet loss (CPL), and
   set a time period for receiving the at least one missing data packet based on a network metric data corresponding to a characteristic of loss of the identified event,
   wherein when the event is identified to be the SL, the at least one processor is further configured to set a length of the time period based on the network metric data corresponding to the SL, wherein the network metric data corresponding to the SL comprises at least one of an estimated smooth round trip time (SRTT) or a round trip time variance (RTTVAR).

9. The terminal of claim 8, wherein the at least one processor is further configured to,
   when the event is identified to be the BL, identify a state of an edge node corresponding to a network state of the terminal, and set a length of the time period based on at least one of the identified state of the edge node or a mobility parameter.

10. The terminal of claim 9, wherein
the at least one processor is further configured to receive the at least one missing data packet during the set length of the time period, based on coordinated Snoop and automatic repeat request (ARQ) retransmission.

11. The terminal of claim 8, wherein
the at least one processor is further configured to, when the event is identified to be the CPL, control a transmission rate of a duplicate acknowledgement (Dup ACK) transmitted from the terminal to the external device.

12. The terminal of claim 11, wherein the at least one processor is further configured to:
identify occurrence of handover of the terminal,
calculate a time required for performing the handover, and
adjust a number of triple Dup ACKs (TDAs) based on the calculated time.

13. The terminal of claim 8, wherein
the at least one processor is further configured to receive the at least one missing data packet from the external device, during the set length of the time period.

14. The terminal of claim 13, wherein the at least one processor is further configured to,
when the event is identified to be the BL or the CPL, transmit a probe packet to the external device, and
receive at least one missing data packet retransmitted from external device, in response to a received ACK for the transmitted probe packet.

15. A non-transitory computer-readable readable medium having stored thereon a program executable by a processor for performing a method comprising:
identifying at least one missing data packet from among a plurality of data packets transmitted from an external device;
identifying an event corresponding to the at least one missing data packet, wherein the event comprises at least one of spurious loss (SL), burst loss (BL), or consecutive packet loss (CPL); and
setting a time period for receiving the at least one missing data packet based on a network metric data corresponding to the identified event, wherein the setting the time period comprises:
when the event is identified to be the SL, setting a length of the time period based on the network metric data corresponding to the SL, wherein the network metric data corresponding to the SL comprises at least one of an estimated smooth round trip time (SRTT) or a round trip time variance (RTTVAR).

* * * * *